(12) United States Patent
Talbot et al.

(10) Patent No.: US 11,380,365 B2
(45) Date of Patent: Jul. 5, 2022

(54) METHODS AND SYSTEMS FOR ANNOTATION AND TRUNCATION OF MEDIA ASSETS

(71) Applicant: Sophya Inc., Allston, MA (US)

(72) Inventors: Morgan Bruce DeWitt Talbot, Boston, MA (US); Vishal Punwani, Victoria (CA); Emma Kathryn Giles, Boston, MA (US)

(73) Assignee: Sophya Inc., Allston, MA (US)

( * ) Notice: Subject to any disclaimer, the term of this patent is extended or adjusted under 35 U.S.C. 154(b) by 0 days.

(21) Appl. No.: 17/228,948

(22) Filed: Apr. 13, 2021

(65) Prior Publication Data

US 2021/0233570 A1 Jul. 29, 2021

Related U.S. Application Data

(63) Continuation of application No. 16/909,270, filed on Jun. 23, 2020, now Pat. No. 11,004,473.

(60) Provisional application No. 62/865,550, filed on Jun. 24, 2019.

(51) Int. Cl.
| | |
|---|---|
| *G11B 27/036* | (2006.01) |
| *H04N 21/845* | (2011.01) |
| *H04N 21/472* | (2011.01) |
| *G06F 40/169* | (2020.01) |
| *G11B 27/00* | (2006.01) |
| *G06K 9/62* | (2022.01) |
| *H04N 21/478* | (2011.01) |
| *G06V 10/44* | (2022.01) |
| *G06V 10/75* | (2022.01) |
| *G06V 20/40* | (2022.01) |

(52) U.S. Cl.
CPC .......... *G11B 27/036* (2013.01); *G06F 40/169* (2020.01); *G06K 9/6256* (2013.01); *G06V 10/44* (2022.01); *G06V 10/751* (2022.01); *G06V 20/41* (2022.01); *G11B 27/005* (2013.01); *H04N 21/478* (2013.01); *H04N 21/47217* (2013.01); *H04N 21/8456* (2013.01)

(58) Field of Classification Search
CPC .. G06K 9/4604; G06K 9/6202; G06K 9/6256; G11B 27/005; H04N 21/47217; H04N 21/478; H04N 21/8456
See application file for complete search history.

(56) References Cited

U.S. PATENT DOCUMENTS

| | | | | |
|---|---|---|---|---|
| 8,671,346 B2 * | 3/2014 | Hua | ....... | G11B 27/28 725/38 |
| 10,319,410 B1 * | 6/2019 | Townsend | ....... | G11B 27/30 |

* cited by examiner

*Primary Examiner* — Mishawn N. Hunter
(74) *Attorney, Agent, or Firm* — Perkins Coie LLP

(57) ABSTRACT

Methods and systems for improving the interactivity of media content. The methods and systems are particularly applicable to the e-learning space, which features unique problems in engaging with users, maintaining that engagement, and allowing users to alter media assets to their specific needs. To address these issues, as well as improving interactivity of media assets generally, the methods and systems described herein provide for annotation and truncation of media assets. More particularly, the methods and systems described herein provide features such as annotation guidance and video condensation.

20 Claims, 12 Drawing Sheets

METHODS AND SYSTEMS FOR ANNOTATION AND TRUNCATION OF MEDIA ASSETS

CROSS-REFERENCE TO RELATED APPLICATION

This application is a continuation of U.S. patent application Ser. No. 16/909,270 filed on Jun. 23, 2020 which claims priority to U.S. Patent Provisional Application No. 62/865,550, filed Jun. 24, 2019, which are hereby incorporated by reference in its entirety.

FIELD OF THE INVENTION

The invention relates to methods and systems for annotation and truncation of media assets.

BACKGROUND

In recent years, the amount of media content available to users and the methods through which users may access and/or interact with media content has greatly increased. This is particularly true in the e-learning space, which has simultaneously seen an increase in the availability and diversity of content.

SUMMARY

Accordingly, methods and systems are disclosed herein for improving the interactivity of media content. The methods and systems disclosed herein are particularly applicable to the e-learning space, which features unique problems in engaging with users, maintaining that engagement, and allowing users to alter media assets to their specific needs. For example, in contrast to media assets consumed by users for entertainment value, which naturally engages users through the entertainment value of their content, media assets in the e-learning space may not be able to rely solely on the entertainment value of their content. Thus, media assets in the e-learning space are particularly prone to users disengaging from the media asset due to disinterest, frustration, and/or other distractions.

To address these issues as well as improve interactivity of media assets generally, the methods and systems described herein provide for annotation and truncation of media assets. More particularly, the methods and systems described herein provide features such as annotation guidance and video truncation. Annotation guidance allows a user to more easily interact with media assets (e.g., by adding notations, highlighting important issues, and/or selecting/modifying specific content within the media asset) as well as to receive guidance and/or feedback on positions within the media assets at which to interact with the media assets (e.g., particular frames and/or areas within a frame to interact with). Video condensation allows a user to condense a given media asset to particular frames or portions (e.g., condensing an hour-long media asset to a subset of frames to convey important information, information based on user interactions, etc.)

Moreover, these features may work in conjunction with each other to provide an overall user experience that increases user interactivity, but also limits any detrimental effects due to disinterest, frustration, and/or other distractions. For example, the methods and system may condense a given media asset to a form in which the subset of frames includes an aggregation of all annotations added by a user for a given subject matter within the media asset. That is, the system may automatically detect different subject matter and/or topics within the media assets and select a frame based on these different topics for inclusion in the condensed media asset. Moreover, the selected frame may be automatically annotated with all of the user annotations that were added to the media asset during a portion or portions of the media assets corresponding to a given topic.

To automatically detect different topics, the methods and system may rely on one or more machine learning or crowd-sourced based systems. For example, the methods and system may detect objects and tag objects that relate to a given topic based on a trained artificial neural network, crowd-sourced boundary detection, and/or crowd-sourced labeling as well as detecting changes in the media asset content as the media asset progresses (e.g., erasure detection). Additionally or alternatively, the methods and systems may use the topic and/or object detection to make the subset of frames indexed and searchable. Similarly, the methods and system may use one or more machine learning or crowd-sourced based systems to condense the media asset based on the detected topics through theme clustering (e.g., based on common keywords/themes detected in audio, text (e.g., transcripts and/or images) and artificial neural networks trained on user inputs and re-segmenting of the media asset subsets.

Additionally or alternatively, the methods and system may provide users with supplemental features and derivative products to improve their overall user experience with the media assets. These supplemental features and derivative products may be used during (e.g., improved user interfaces for reviewing, editing, and/or analyzing annotations, automatic pausing of the media assets, etc.) and after (e.g., summaries of the media asset and/or the subset of the media asset in a format that is easily distributed and/or provides an optimal learning tool (e.g., flashcard generation, handout creation, questionnaire creation).

Through these features, the methods and systems disclosed herein address users disengaging from the media asset due to disinterest, frustration, and/or other distractions as well as improve the interactivity with the media asset, particularly in the e-learning environment. For example, the features aid in mimicking the in-person and paper-based environment of traditional educational institutions by providing a less-burdensome mechanism for taking notes, highlighting issues, and creating review materials. Annotation guidance and video condensation aids in relieving ill effects that may be caused by momentary distractions of a user consuming a media asset by allowing a user to catch-up and highlight key issues. The additional interactivity further enables a user to follow-up and more thoroughly engage with the media asset (e.g., through note taking) thus increasing engagement and limiting disinterest. Additionally, the annotation guidance and video condensation aids in relieving boredom (e.g., by customizing a length and/or presentation style of a media asset to a user) as well as the frustration (e.g., encountered in an e-learning environments) by users based on not comprehending new concepts and/or not receiving instruction at their own pace.

In some aspects, systems and methods for truncating media assets are described. For example, the system may receive a media asset comprising a series of frames. The system may compare first content presented to a user at a first frame in the series of frames and second content presented to the user at a second frame in the series of frames to determine a level of difference between the first content and the second content. The system may determine that the first frame corresponds to a scene transition of a first scene based on the level of difference. The system may, in response to determining that the first frame corresponds to the scene transition of the first scene, select a third frame in the series of frames to include in a truncated version of the media asset based on the third frame appearing in the series of frames a predetermined number of frames earlier than the first frame. The system may generate for simultaneous display, on a local device, the media asset in a first portion of a user interface and the third frame in a second portion of the user interface, wherein the second portion of the user interface corresponds to the truncated version, and wherein the third frame represents the first scene in the truncated version.

In some aspects, systems and methods for content-preserving scene recognition in media assets are described. For example, the system may receive a media asset comprising a series of frames. The system may extract a first frame and a second frame from the media asset, wherein the second frame is subsequent to the first frame in the series of frames. The system may generate, using an edge detection operation, a first image corresponding to the first frame and a second image corresponding to the second frame. The system may determine a level of difference between the first image and the second image. The system may compare the level of difference to a threshold level of difference. The system may, in response to determining that the level of difference equals or exceeds the threshold level of difference, select the first frame as a first scene transition frame. The system may, in response to determining that the first frame corresponds to the first scene transition frame, select a third frame in the series of frames to include in a truncated version of the media asset based on the third frame appearing in the series of frames a predetermined number of frames earlier than the first frame.

In some aspects, systems and methods for providing annotation guidance for media assets are described. For example, the system may receive a media asset comprising a series of frames. The system may compare first content presented to a user at a first frame in the series of frames and second content presented to the user at a second frame in the series of frames to determine a first level of difference between the first content and the second content. The system may determine that the first frame corresponds to scene transition of a first scene based on the first level of difference. The system may, in response to determining that the first frame corresponds to the scene transition of the first scene, select a third frame in the series of frames that is in the first scene. The system may determine a first location of the third frame where content present in a respective first location of the first frame is not present. The system may generate for display, on a local device, the third frame with a foreshadowing overlay at the first location.

In some aspects, systems and methods for generating derivative products based on truncated media assets are described. For example, the system may receive a media asset comprising a series of frames. The system may generate for simultaneous display, on a local device, a first frame of the media asset in a first portion of a first user interface and a first option, in a second portion of the first user interface, for creating a derivative product based on the first frame, wherein the first portion of the first user interface provides playback functionality for the media asset. The system may, in response to a first user input selecting the first option, generate for display a third portion of the first user interface, wherein the third portion comprises a second option for adding a detail to the derivative product and a third option for storing the derivative product. The system may, in response to a second user input selecting the second option, adding the detail to the derivative product. The system may, in response to a third user input selecting the third option, storing the derivative product. The system may generate for display, on the local device, a second user interface for displaying derivative products. The system may in response to a fourth user input requesting access to the derivative product, generate for display the detail in the second user interface and a fourth option for accessing the first frame. The system may, in response to a fifth user input selecting the fourth option, generate for display the first frame.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification "a portion," refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known structures and devices are shown in block diagram form in order to avoid unnecessarily obscuring the embodiments of the invention.

Figure 1:
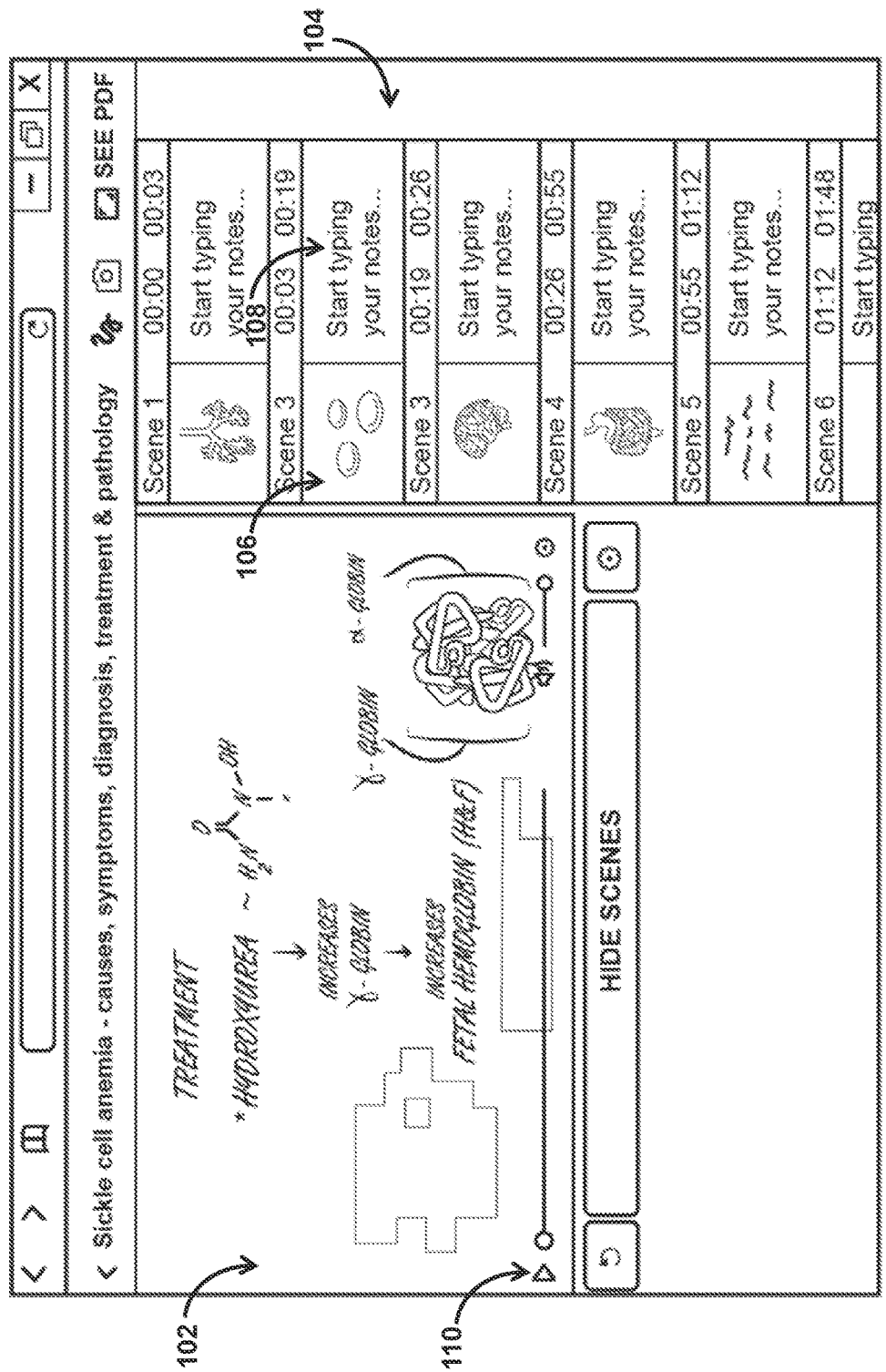
FIG. 1 shows an illustrative user interface of system for displaying truncated media assets, in accordance with one or more embodiments.

FIG. 1 shows an illustrative user interface of a system for displaying truncated media assets, in accordance with one or more embodiments. In some embodiments, user interface 100 (as well as the user interfaces described below may comprise a user interface of a guidance application. In some embodiments, the guidance application may be part of an e-learning system, which provides media assets along given pathways or learning curriculum.

The guidance applications may allow users to navigate among and locate content related to videos, presentations, video clips, audio assets, articles, advertisements, chat sessions, games, etc. and/or multimedia presentations. The term multimedia is defined herein as media and content that utilizes at least two different content forms, such as text, audio, still images, animation, video, and interactivity content forms. Multimedia content may be recorded and played, displayed or accessed by information content processing devices, such as computerized and electronic devices, but may also be part of a live performance. It should be understood that the invention embodiments that are described in relation to media or media content are also applicable to other types of content, such as video, audio and/or multimedia.

The guidance application may present media assets (e.g., media asset 102). As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, PowerPoint presentations, rotating images, documents, playlists, websites, articles, books, electronic books, blogs, advertisements, chat sessions, social media, applications, games, and/or any other media or multimedia and/or combination of the same.

The guidance application may allow media assets (e.g., media asset 102 and truncated version 104) to be personalized based on user preferences and/or annotations. This personalized experience may be generated by allowing the user to enter these annotations and/or by monitoring passive activity to determine various user preferences. A user may access the guidance application by logging in or otherwise identifying providing identification to the guidance application. Customization includes a presentation method (for example, a display color method, a text font size, etc.), content displayed (e.g., a personalized truncated version of the media asset), desired recording/playback characteristics (e.g., speed of playback, whether or not auto-pause is scheduled to occur, etc.), parental control settings, and/or customized presentation of Internet content (e.g., social media, object links, email, presentation of electronically distributed articles, etc.), and other desired customizations. The guidance application may allow a user to provide user profile information or may automatically compile user profile information. The media guide application may, for example, monitor content accessed by the user and/or other interactions that the user may have with the guidance application. For example, the system may receive a first user input selecting playback of media asset 102. The system may then play back media asset 102 in the first portion. The system may also graphically accentuate a second frame of truncated version 104 in the second portion when a point of playback of the media asset corresponds to the second frame.

For example, in some embodiments, the system may allow users to annotate videos using a touchscreen, digital stylus, mouse, keyboard, or other input device, and to save or download content from the videos combined with their own annotations as static or dynamic documents such as PDF files, animated GIFs, one or more shorter video clips, or digital slideshows. Annotations may be superimposed over the video on the device screen, and/or may be added in separate locations on a device screen. The extracted video slides may also be saved or downloaded without annotations (e.g., for use in review or to be annotated on a separate window/device while watching the media asset). After the annotations are made, the user may watch the video additional times and see their annotations re-appear or be recreated (possibly in modified form) as the media asset progresses. For example, each pixel added by a stylus for annotation purposes may reappear at the time it was added during the first viewing of the media asset. While re-watching a previously annotated media asset, the system may receive and store further additions or modifications to their existing annotations. In some embodiments, the system may additionally or alternatively enable the user to export the annotated video as a new video (e.g., an instructor may annotate an educational video to provide additional context for their students, and then share the customized video with them). The system may also include features that guide the locations of the user's annotations such that they are optimally positioned and/or do not interfere with the original video content (e.g., through annotation guidance) or, alternatively, modify the annotations or the media asset itself to optimize the combination of video content and annotations, or to avoid or minimize interference between video content and annotations. For example, while the system plays the media assets, graphics may be superimposed on the user interface window to indicate where content will be added later in the video (e.g., foreshadowing overlays), allowing the user to avoid adding annotations that overlap or interfere with these areas.

Further, the annotations themselves may be analyzed using computer vision and natural language processing to activate other functions that enable the user to interact with the media asset. Users may therefore be enabled to annotate educational videos or recorded class lectures. Adding superimposed annotations to videos rather than writing notes separately often minimizes repetitive copying, freeing up cognitive resources while watching the media asset to allow deeper engagement with the educational content. In one embodiment, the student may export derivative products (e.g., a pdf file containing a truncated version of the media asset) with their own annotations superimposed, and this derivative product may serve as an efficient study guide for review of concepts presented during the media asset. This may save time for users who do not wish to re-watch a media asset for review purposes, which may be more time-consuming and less efficient than briefly reviewing a truncated version of the media asset.

Figure 5:
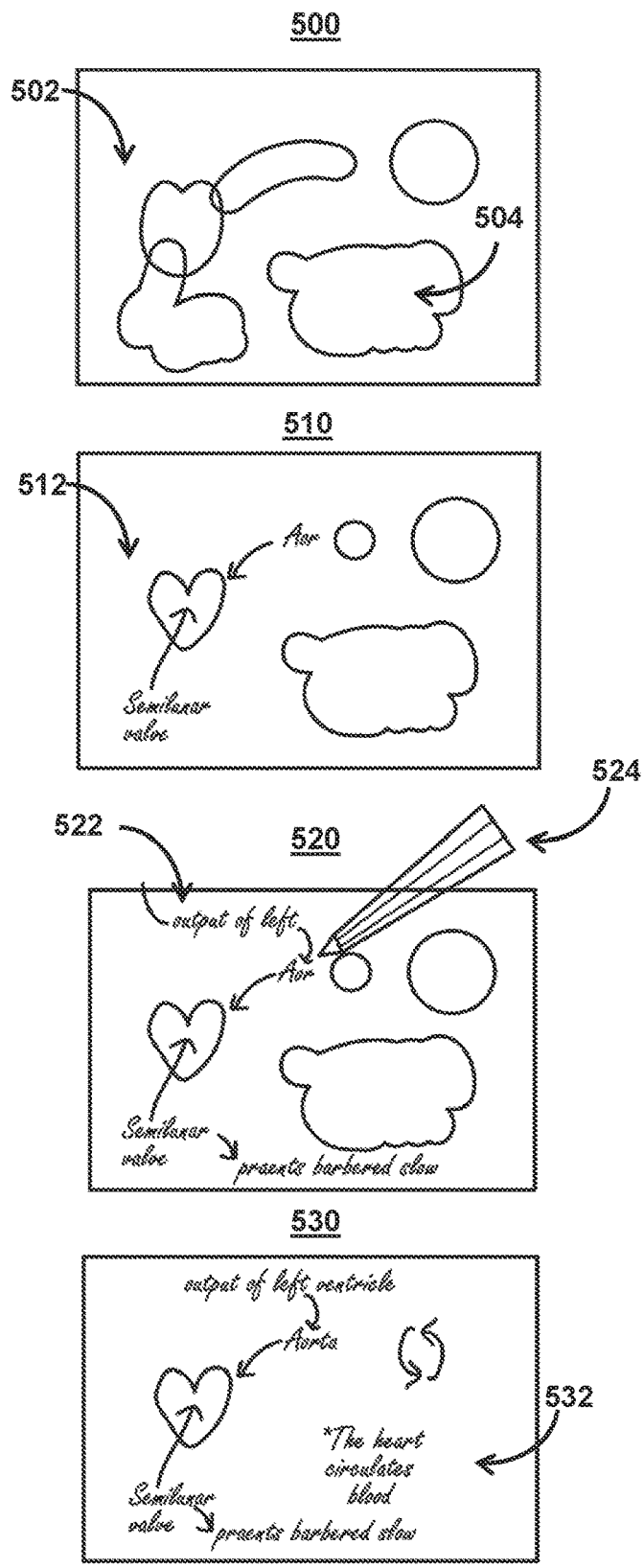
FIG. 5 shows exemplary user interfaces of a system for providing annotation guidance for media assets, in accordance with one or more embodiments.

For example, user interface 100 includes media asset 102 in a first portion of user interface 100 and a truncated version of the media asset (e.g., truncated version 104) in a second portion of user interface 100. As shown in user interface 100, the system may playback media asset 102 in the first portion (e.g., upon receipt of a user input selection playback option 110). While being played back, media asset 102 may present various types of content. The system may also receive user annotations (e.g., directly to media asset 102) as shown in FIG. 5 below. Media asset 102 may continue to be played until a user selection of option 110 and/or until an auto-pause is triggered by the system (e.g., as described below).

Truncated version 104 is also displayed in user interface 100. Furthermore, as media asset 102 is played back, various portions of truncated version 104 (e.g., represented by thumbnail 106 and textual information 108) may be graphically accentuated to indicate that a portion of truncated version 104 corresponds to a currently display frame (or scene of media asset 102.).

Thumbnail 106 may represent a scene transition frame (e.g., as selected and/or as described below). Textual information 108 may include annotations added by the user (and/or may be selectable for a user to ad annotations). Alternatively or additionally, textual information 108 may provide textual descriptions of content from a scene. For example, this textual content may correspond to objects appearing in the media asset and/or subtitles or transcriptions of audio content presented during a scene.

For example, the system may receive a first user input (e.g., of option 110) selecting playback of media asset 102. The system may then play back the media asset in the first portion. The system may then graphically accentuate a second frame (e.g. thumbnail 106) in the second portion when a point of playback of media asset 102 corresponds to the second frame (e.g., when a current scene of media asset 102 corresponds to a scene of thumbnail 106). The system may further receive a second user input adding an annotation a frame in the media asset currently displayed in the first portion. The system may automatically pause playback of the media asset in the first portion based on the second user input and/or based on determine a current frame is a scene transition frame.

As referred to herein, a "scene transition frame" represents a frame of a scene (e.g., a group of frames of the media asset having similar content) that is used to represent the scene in truncated version 104. The scene transition frame may correspond to a frame having a maximum amount of content (e.g., a summary slide) of content from the scene. For example, in some embodiments, an image processing algorithm analyzes the media asset to be viewed at or before the time the user begins viewing it, and identifies a number of modified, recombined, synthesized, or unmodified visual elements from the media asset that form a condensed "summary" of the original media asset. In some embodiments, the algorithm identifies a subset of the original media asset's frames into scene transition frames that capture as much of the visual content of the media asset as possible without requiring an excessively large number of frames.

In some embodiments, the system is able to identify scene transition frames from certain classes of media assets described as follows. In a popular style of expository media assets that is sometimes known colloquially as "blackboard teaching media assets", handwriting, drawings, and other graphics are progressively added to a digital canvas before being erased (or otherwise transitioned away from by panning, zooming, fading, etc.) in order to make room for more content. In such media assets, there is typically a limited number of frames in the media asset in which a substantial collection of graphics has disappeared, moved, or changed in size since the previous frame. Selecting one frame immediately prior to each of these erasures can create an adequate static scene transition of most or all of the visual content of the media asset. There are additional classes of media assets that are also amenable to the same form of analysis. For example, a media asset that consists entirely of a series of static slides can be summarized by choosing one media asset frame for each static slide—each slide transition can be considered an "erasure" of one set of content couple with the addition of more content. Another class of media assets amenable to this form of analysis consist of static slides to which handwritten, drawn, or other graphics are added progressively. A slide transition in such a media asset (at which time progressively added graphics may also disappear) can also be considered an erasure event.

With classes of media assets not amenable to the above form of analysis, some embodiments may recombine information from multiple frames into single frame of a scene transition frame. For example, a media asset scene with graphics that are frequently animated or move about the canvas may be summarized by a scene showing these graphics in their final positions, accompanied by (for example) arrows or translucent representations that indicate their paths of motion.

With additional classes of media assets not amenable to the above forms of analysis, some embodiments may select representative frames of a desired quality from distinct "scenes" in the media asset, which may still form a useful static scene transition of the media asset content. For example, in one embodiment, in a media asset based on filmed footage or highly animated scenes, an algorithm used by the system may first divide the media asset into scenes, and then select a frame from each scene that has a color histogram profile most comparable to the average profile for frames in that scene, while also containing crisp edges or otherwise clearly represented content (for example, the algorithm would avoid frames that are blurred due to camera motion).

It should be noted that a scene as referred to herein may include any segmentation of the media asset based on frames having related content. For example, the system may identify multiple "scenes" in a video. The system may not always segment media assets to neatly align with traditional scenes. For example, in an online learning embodiment, an instructor may erase a small amount of content, but does not start a substantially new "scene" at that time. Nonetheless, the system may preserve a scene transition frame to avoid excluding the erased content from the truncated version of the media asset. For example, a "scene" may include a segment of a media asset that ends when content changes (e.g. due to an erasure).

In some embodiments, the system may include a media asset classifier algorithm that analyses media assets prior to beginning the above forms of analysis, in order to determine which analysis method will be the most appropriate for the given media asset (or, alternatively, which analysis methods will be most appropriate for individual scenes/sections of the media asset).

In some embodiments, in addition to using visual information from the media asset, the audio track accompanying the media asset may be analyzed by the system to help determine optimal transition times between scenes in the media asset. For example, the vocal inflections or pauses associated with the ending of a sentence can be detected by an audio processing algorithm, and the timing of detected scene transitions can be adjusted to avoid cutting off a speaker's sentence (or other sound effect) if the media asset is to be paused automatically at the end of a scene (details below).

In some embodiments, the system may utilize summaries of media assets prepared by manual selection of a set of media asset frames, and/or by crowdsourcing ideal frame selections from many people who select scene transition frames from the same media asset. As another example, the summaries may be generated at the time of the media asset's initial creation, perhaps by the system used to generate the media asset content itself (which might not require any image analysis).

During playback of media asset 102, the system may receive use annotations. As referred to herein, "annotations" refers to any information added by a user to original, modified, recombined, partial, or complete representations of the content of a video. In some embodiments, one or more different annotation methods may be used. For example, in some embodiments, hand written/drawn annotations may be added using a finger or a digital stylus on a touch screen, or by using a mouse, drawing tablet, or some other input device, such that the annotations are superimposed on the media asset. In another example, text may be entered by typing, dictation/voice recognition, or some other text entry mechanism, such that the text annotations are superimposed on the media asset. In another example, pre-formed graphics from a template or an external source (e.g. predefined shapes, other graphics produced using vector drawing tools, whole images, GIFs, or video clips) may be superimposed on the media asset. In another example, any of the above annotations may also be entered in an annotation/input area that is separate from the media asset itself (e.g., entered video textual information 108).

Figure 2:
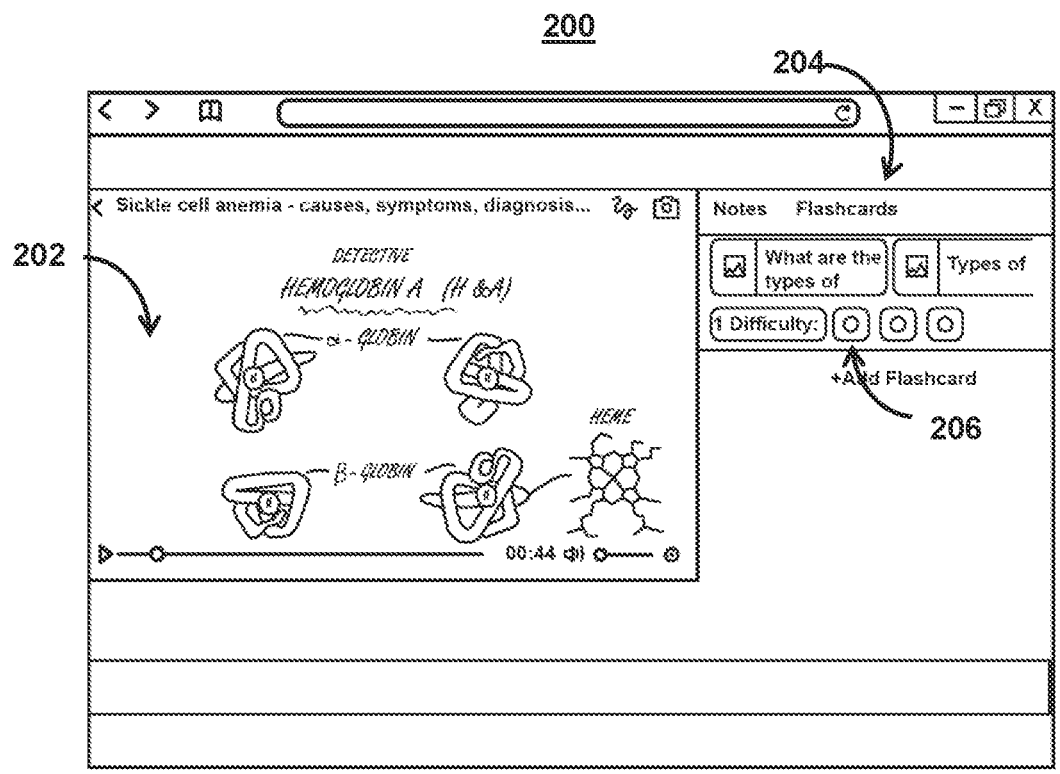
FIG. 2 shows an illustrative user interface of system for generating derivative products based on truncated media assets, in accordance with one or more embodiments.
Figure 2:
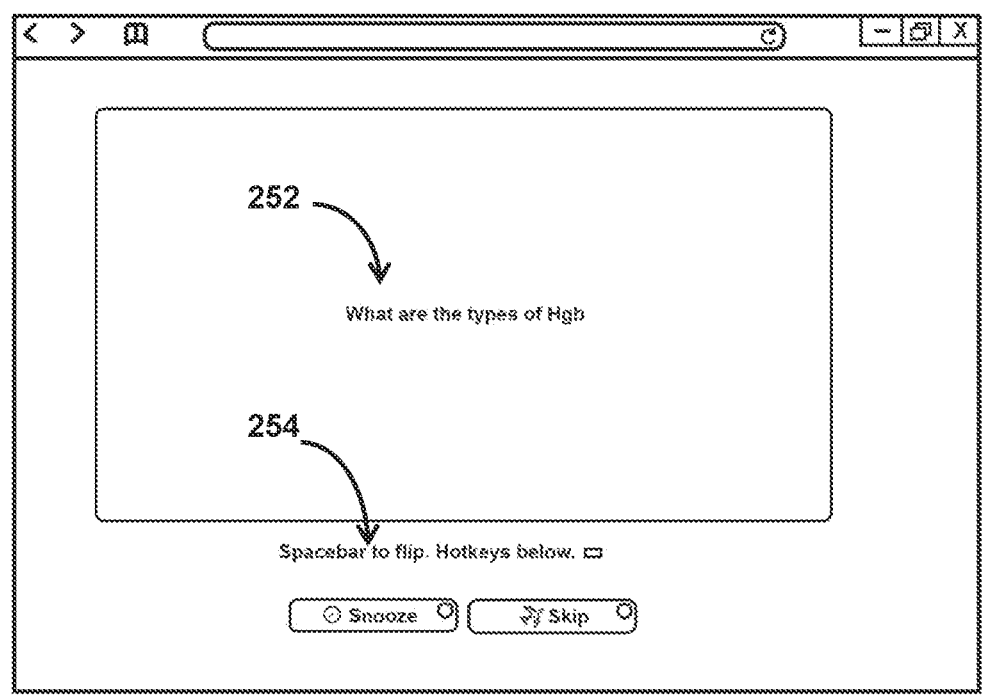

FIG. 2 shows an illustrative user interface of system for generating derivative products based on truncated media assets, in accordance with one or more embodiments. For example, derivative products may include any product based on and/or related to the truncated version (e.g., truncated version 104), in which content of the derivative product is automatically sourced from the truncated version of a media asset. For example, as shown in user interface 200, derivative product may comprise a virtual flashcard.

In user interface 200, the system may display frame 202. Frame 202 may comprise a frame of a truncated version of a media asset (e.g., truncated version 104 (FIG. 1)). In response to option 204, the system may generate a derivative product (and/or store information for a derivative product) based on frame 202 (e.g., without further user input. Accordingly, the system may allow a user to quickly and easily create a derivative product that includes content based on a truncated version of a media asset, which includes annotations made to one or more frames (e.g., all annotations of a scene) of the truncated version. For example, the system may receive one or more inputs to option 206 setting textual content, difficulty levels, etc. for use in generating the derivative product. User interface 250 displays an example of a derivative product. For example, the derivative product may include content 252, which may be based on information entered via option 206. The system may then receive a user input (e.g., in response to prompt 254), which causes frame 202 to be displayed.

Figure 3:
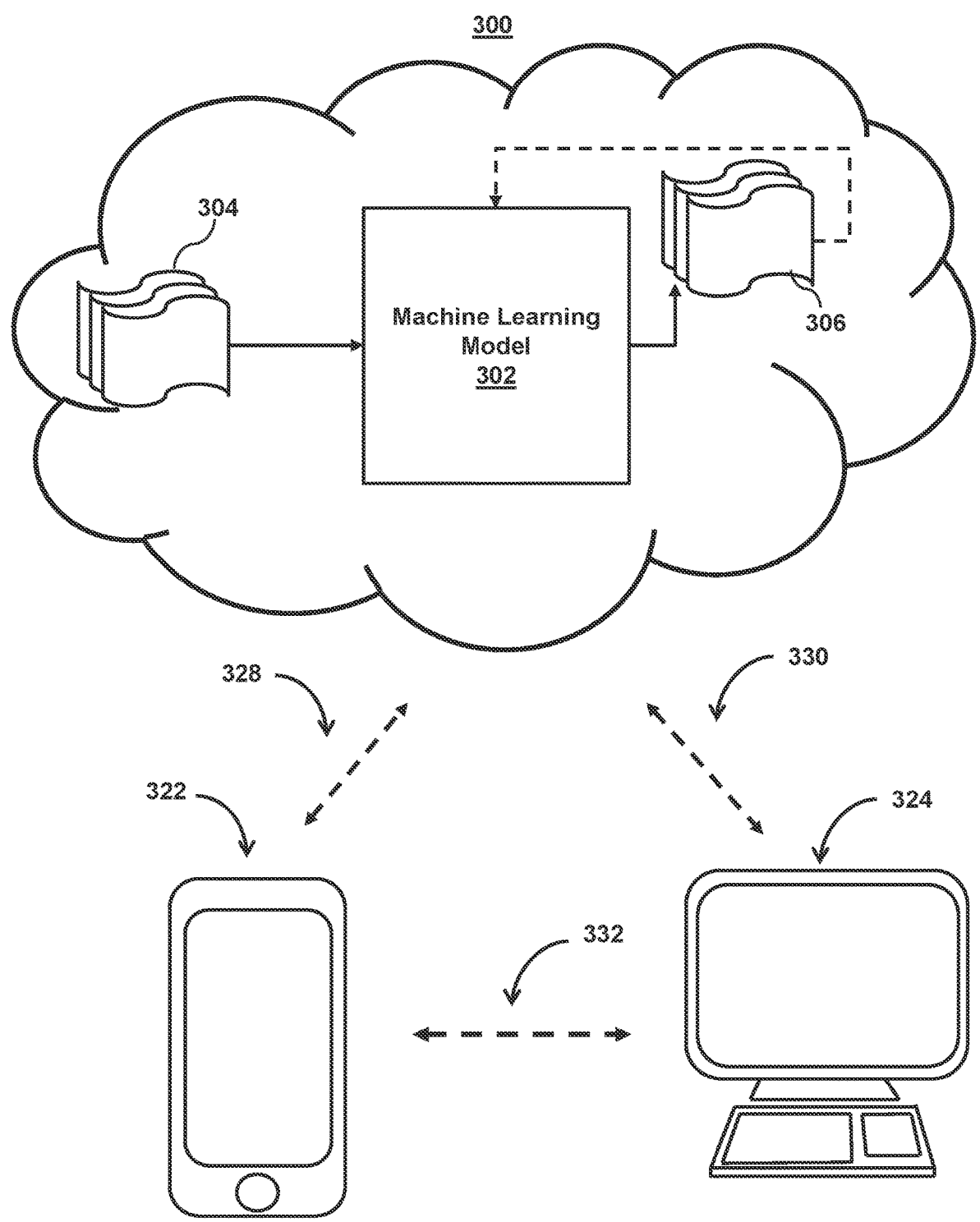
FIG. 3 shows an illustrative system diagram for truncating media assets, in accordance with one or more embodiments.

FIG. 3 shows an illustrative system for displaying truncated media assets, in accordance with one or more embodiments. As shown in FIG. 3, system 300 may include user device 322, user device 324, and/or other components. Each user device may include any type of mobile terminal, fixed terminal, or other device. Each of these devices may receive content and data via input/output (hereinafter "I/O") paths and may also include processors and/or control circuitry to send and receive commands, requests, and other suitable data using the I/O paths. The control circuitry may be comprised of any suitable processing circuitry. Each of these devices may also include a user input interface and/or display for use in receiving and displaying data.

By way of example, user device 322 and user device 324 may include a desktop computer, a server, or other client device. Users may, for instance, utilize one or more of the user devices to interact with one another, one or more servers, or other components of system 300. It should be noted that, while one or more operations are described herein as being performed by particular components of system 300, those operations may, in some embodiments, be performed by other components of system 300. As an example, while one or more operations are described herein as being performed by components of user device 322, those operations may, in some embodiments, be performed by components of user device 324. System 300 also includes machine learning model 302, which may be implemented on user device 322 and user device 324, or accessible by communication paths 328 and 330, respectively. It should be noted that, although some embodiments are described herein with respect to machine learning models, other prediction models (e.g., statistical models or other analytics models) may be used in lieu of, or in addition to, machine learning models in other embodiments (e.g., a statistical model replacing a machine learning model and a non-statistical model replacing a non-machine learning model in one or more embodiments).

Each of these devices may also include memory in the form of electronic storage. The electronic storage may include non-transitory storage media that electronically stores information. The electronic storage of media may include: (i) system storage that is provided integrally (e.g., substantially non-removable) with servers or client devices; and/or (ii) removable storage that is removably connectable to the servers or client devices via, for example, a port (e.g., a USB port, a firewire port, etc.) or a drive (e.g., a disk drive, etc.). The electronic storages may include optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 4G or LTE network), a cable network, a public switched telephone network, or other types of communications network or combinations of communications networks. Communication paths 328, 330, and 332 may include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

As an example, with respect to FIG. 3, machine learning model 302 may take inputs 304 and provide outputs 306. The inputs may include multiple data sets such as a training data set and a test data set. In some embodiments, outputs 306 may be fed back to machine learning model 302 as input to train machine learning model 302 (e.g., alone or in conjunction with user indications of the accuracy of outputs 306, labels associated with the inputs, or with other reference feedback information).

For example, in some embodiments, the system may use a machine learning model to compare the first content and the second content to determine the level of difference between the first content and the second content by inputting the first frame and second frame into a machine learning model and/or neural network. The machine learning model and/or neural network may be trained by inputting a labeled feature input into the machine learning model and/or neural network, wherein the labeled feature input corresponds to data for a training frame. The system may train the machine learning model and/or neural network to classify the data for the training frame as corresponding to a known classification, wherein the known classification corresponds to a known scene.

In another embodiment, machine learning model 302 may update its configurations (e.g., weights, biases, or other parameters) based on the assessment of its prediction (e.g., outputs 306) and reference feedback information (e.g., user indication of accuracy, reference labels, or other information). In another embodiment, where machine learning model 302 is a neural network, connection weights may be adjusted to reconcile differences between the neural network's prediction and the reference feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this way, for example, the machine learning model 302 may be trained to generate better predictions.

For example, the system may receive data related to user re-classifications of frames classified into scenes by the machine learning model and/or neural network. The system may then train the machine learning model and/or neural network based on the user re-classifications. For example, the system may re-train and re-sample may refine the artificial neural network and/or other machine learning algorithm based on user inputs and/or subsequent modifications to classifications. For example, after determining a scene transition frame and/or a identifying a set of frames corresponding to a scene, the system may receive user inputs re-segmenting (or re classifying) the scene transition frame and/or frames in a scene. These inputs may then be used to re-trained the artificial neural network and/or other machine learning algorithm.

In some embodiments, machine learning model 302 may include an artificial neural network. In such embodiments, machine learning model 302 may include an input layer and one or more hidden layers. Each neural unit of machine learning model 302 may be connected with many other neural units of machine learning model 302. Such connections can be enforcing or inhibitory in their effect on the activation state of connected neural units. In some embodiments, each individual neural unit may have a summation function which combines the values of all of its inputs together. In some embodiments, each connection (or the neural unit itself) may have a threshold function that the signal must surpass before it propagates to other neural units. Machine learning model 302 may be self-learning and trained, rather than explicitly programmed, and can perform significantly better in certain areas of problem solving, as compared to traditional computer programs. During training, an output layer of machine learning model 302 may correspond to a classification of machine learning model 302 and an input known to correspond to that classification may be input into an input layer of machine learning model 302 during training. During testing, an input without a known classification may be input into the input layer, and a determined classification may be output.

In some embodiments, machine learning model 302 may include multiple layers (e.g., where a signal path traverses from front layers to back layers). In some embodiments, back propagation techniques may be utilized by machine learning model 302 where forward stimulation is used to reset weights on the "front" neural units. In some embodiments, stimulation and inhibition for machine learning model 302 may be more free-flowing, with connections interacting in a more chaotic and complex fashion. During testing, an output layer of machine learning model 302 may indicate whether or not a given input corresponds to a classification of machine learning model 302. Machine learning model 302 may use an image (or images) related to a frame of a media asset, content in a frame, and/or objects related to content. For example, the machine learning model 302 may input an image (or images) related to a frame of a media asset, a frame, content in a frame, and/or objects related to content.

System 300 may iteratively adjust the model based on additional data to continually lower the threshold score above which any prediction score corresponds to the given classification. For example, as system 300 receives more training data, system 300 may refine the artificial neural network and/or other machine learning algorithm to better classify an image (or images) related to a frame of a media asset, a frame, content in a frame, and/or objects related to content. Moreover, the system may re-train and re-sample, or may refine the artificial neural network and/or other machine learning algorithm based on user inputs and/or subsequent modifications to classifications. For example, after determining a scene transition frame and/or a identifying a set of frames corresponding to a scene, the system may receive user inputs re-segmenting (or re classifying) the scene transition frame and/or frames in a scene. These inputs may then be used to re-train the artificial neural network and/or other machine learning algorithm.

Figure 4:
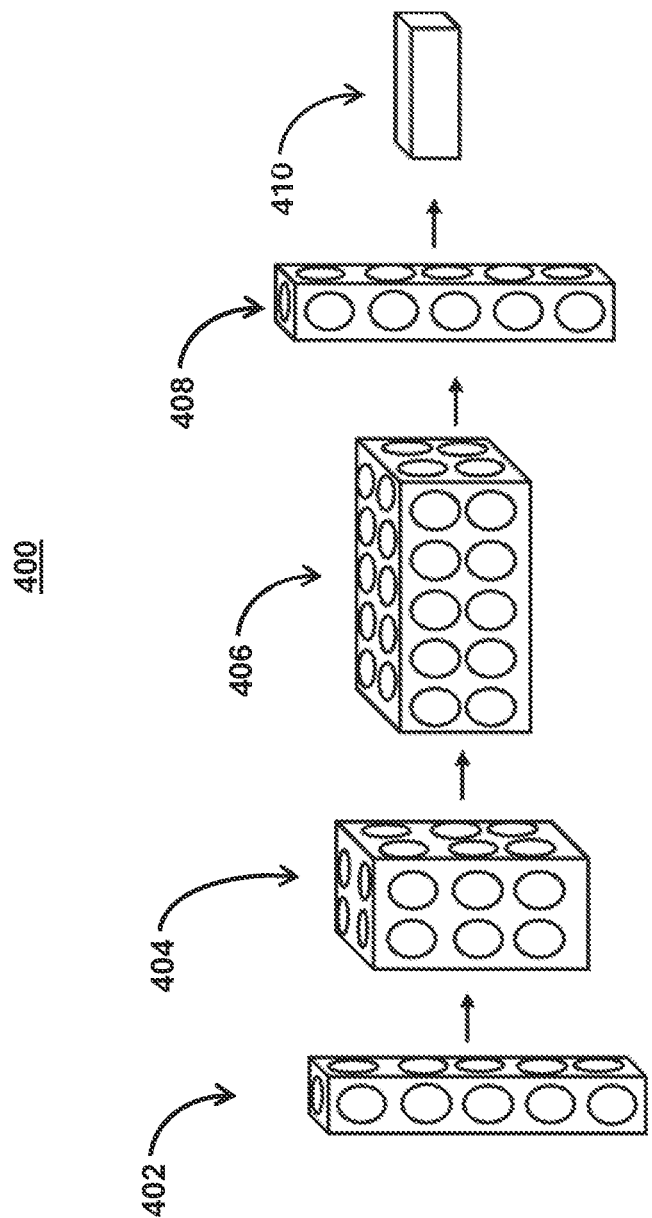
FIG. 4 shows a neural network used for truncating media assets and providing related features, in accordance with one or more embodiments.

FIG. 4 shows graphical representations of artificial neural network models for classifying an image (or images) related to a frame of a media asset, a frame, content in a frame, and/or objects related to content, in accordance with one or more embodiments. For example, in some embodiments, model 400 may be used to identify objects in a frame of a media asset (e.g., as described in FIGS. 6-8 below).

Model 400 illustrates an artificial neural network. Model 400 includes input layer 402. Images (or vector arrays based on images) may be entered into model 400 at this level. Model 400 also includes one or more hidden layers (e.g., hidden layers 404, 406, and 408). Model 400 may be based on a large collection of neural units (or artificial neurons). Model 400 loosely mimics the manner in which a biological brain works (e.g., via large clusters of biological neurons connected by axons). Each neural unit of a model 400 may be connected with many other neural units of model 400. Such connections can be enforcing or inhibitory in their effect on the activation state of connected neural units. In some embodiments, each individual neural unit may have a summation function which combines the values of all of its inputs together. In some embodiments, each connection (or the neural unit itself) may have a threshold function that the signal must surpass before it propagates to other neural units. Model 400 may be self-learning and trained, rather than explicitly programmed, and can perform significantly better in certain areas of problem solving, as compared to traditional computer programs. During training, output layer 410 may correspond to a classification of model 400 (e.g., for an image (or images) related to a frame of a media asset, a frame, content in a frame, and/or objects related to content) and an input known to correspond to that classification may be input into input layer 402. In some embodiments, model 400 may include multiple layers (e.g., where a signal path traverses from front layers to back layers). In some embodiments, back propagation techniques may be utilized by model 400 where forward stimulation is used to reset weights on the "front" neural units. In some embodiments, stimulation and inhibition for model 400 may be more free-flowing, with connections interacting in a more chaotic and complex fashion. Model 400 also includes output layer 410. During testing, output layer 410 may indicate whether or not a given input corresponds to a classification of model 400 (e.g., whether or not an data corresponds to an image (or images) related to a frame of a media asset, a frame, content in a frame, and/or objects related to content).

Model 400 may be a convolutional neural network ("CNN"). The convolutional neural network is an artificial neural network that features one or more convolutional layers. Convolution layers extract features from an input image. Convolution preserves the relationship between pixels by learning image features using small squares of input data. For example, the relationship between the individual parts of an image (or images) related to a frame of a media asset, a frame, content in a frame, and/or objects related to content may be preserved.

FIG. 5 shows exemplary user interfaces of a system for providing annotation guidance for media assets, in accordance with one or more embodiments. For example, FIG. 5 provides an illustrative example of providing foreshadowing overlays. It should be noted that as referred to herein, a "foreshadowing" overlay may comprise any overlay that indicates the presence and/or location of content in a future frame of a current scene. The foreshadowing overlay may partially or fully obscure the content. For example, in some embodiments, the system may analyze the media asset by including identification of spatial areas in the media asset where media asset content will appear or will be present in a summary of the media asset, or areas where the user is recommended to add annotations.

It should also be noted that in some embodiments, the system may present whitespace overlays. As referred to herein, a "whitespace" overlay may comprise any overlay that indicates the lack of and/or location where no content is displayed in a future frame of a current scene. For example, an overlay is produced by the system that is spatially complementary or opposite to that described in the previous paragraph—that is, the overlay is present in spatial locations where content will not appear in the media asset, or, more generally, highlights areas where it is possible (according to the results of the algorithm) for annotations to be added without interfering with future media asset content. In some embodiments, the overlay additionally/alternatively indicates recommendations for spatial locations in the media asset at which annotations would be especially valuable. For example, a salient drawing in the media asset may be accompanied by an overlay that includes an arrow and a writing/drawing area to label or describe the drawing.

It should be noted that other sensory cues may be used to convey guidance regarding where annotations should or should not be placed on the media asset screen. For example, when the user adds an annotation (or, hovers over or otherwise selects a location to annotate) in a location that analysis of the media asset indicates would interfere with future media asset content, a visual, auditory, tactile, or other cue may be displayed warning the user about the potential for interference. As another example, a sensory cue may be issued when the user annotates, hovers over, or otherwise selects a location that is amenable to annotation or at which annotation would be especially valuable.

Frame 500 includes foreshadowing overlay 502. Foreshadowing overlay 502 may presently block the entirety of content in a media asset being displayed, which may demonstrate the locations of all content being displayed in a current scene of the media asset (e.g., media asset 102 (FIG. 1)). Whitespace overlay 504 may indicate an area of the scene for which not content is to be displayed (allowing a user to add annotations here without fear of obscuring content yet to be revealed). For example, in some embodiments of this analysis, the analysis produces an animated overlay to be superimposed on the media asset player (and possibly additional areas of the screen, such as those where non-superimposed annotations will take place). FIG. 5 illustrates how this "foreshadowing" overlay facilitates media asset annotation corresponding to a media asset. At a given time in the media asset's playback, the overlay is present at spatial locations where content will appear later during the media asset (or later during a present time segment or scene of the media asset), but has not yet appeared at the present playback time.

Frame 510 now demonstrates that part of foreshadowing overlay 502 has been removed to show object 512. For example, frame 510 may represent a frame that has been progressed to in the scene of the media asset. For example, object 512 has now been displayed. It should be noted that the overlay may not strictly indicate where content will appear, but may more generally indicate locations where the user is not recommended to add annotations. For example, in one embodiment, the overlay consists of a blurred, translucent, or otherwise modified version of the media asset content that will appear later in the media asset (such that the overlay is distinguishable from the actual content when it does appear). In one embodiment, a gradient based on color, texture, or other parameters is employed to indicate the timing of content addition associated with each part of the overlay (e.g., the overlay may become darker in color where it indicates graphics that will appear much later in the media asset, and lighter when it indicates graphics that will appear soon after the present playback time). In certain other embodiments, the overlay consists of shapes, polygons, outlines, textures, or any other graphic representing the spatial locations at which content will appear.

At frame 520, the system has received a user input (e.g., via input mechanism 524) adding annotation 522. The system may continue to display annotation 522 for the remainder of the scene. For example, the system may determine a current scene for the frame in the media asset currently displayed in the first portion (e.g., of user interface 100 (FIG. 1)). The system may continue to display the annotation (e.g., annotation 522) on subsequently displayed frames (e.g., frame 530) in the current scene. The system may only remove the annotation (e.g., annotation 522) in response to determining the frames in the current scene are no longer displayed in the first portion (e.g., after frame 530, which is determined to be a scene transition frame).

At frame 530, the system may receive a second annotation (e.g., annotation 532) to the indicated whitespace. In response, the system has removed whitespace overlay 504. In some embodiments, frame 530 may constitute a scene transition frame for the current scene. For example, frame 530 may appear in a truncated version of a media asset (e.g., truncated version 104 (FIG. 1)). In such cases, annotation 522 and annotation 532 may be presented in the scene transition frame.

For example, in some embodiments, while the user watches and annotates a media asset, guidance in the form of visual or other cues is provided to enable the user to select appropriate or optimal locations at which to add annotations that are superimposed on the media asset (the methods of guidance are described in the previous section).

In some embodiments, the annotations are modified by the system after their creation, entry, or modification, such that they do not interfere with media asset content or such that they are optimized in some other way. For example, superimposed text boxes with typed annotations, or handwritten annotations, may be shrunken, made transparent or translucent, or minimized in some other way by the system until selected or queried by the user (e.g., by clicking or hovering with a mouse or tablet stylus, in a manner similar to a tooltip). As another example, annotations may be made translucent or invisible a short time after being entered, or annotations may be made translucent or invisible when they interfere with media asset content that appears later in the media asset. In some embodiments, a duplicate view of the media asset, or more generally an additional view of the truncated version of the media asset is displayed elsewhere on the screen or in another view. In this embodiment, the user can annotate one view of the media asset while viewing the other, such that any annotations do not interfere with the visibility of media asset playback.

In some embodiments, annotations superimposed on the media asset player, and/or content from the original media asset, are spatially or temporally rearranged or repositioned by the system in order to prevent or minimize interference between the media asset content and the annotations. For example, if content appears that overlaps or interferes with a previously added annotation, the system may move the annotation to an annotation area separate from the media asset, while retaining a link to its original location, such as a dotted line. As another example, a scene might begin with content being added to the left half of the screen, and the user may therefore annotate the right half of the screen. Later in the same scene, media asset content may appear in the right half of the screen that would interfere with the annotations. The system could compensate by moving the content that was present in the right half of the screen to a designated area underneath the media asset player, or by saving and removing the annotations on the right side of the screen (e.g., in addition to or in lieu of moving the content).

In some embodiments, when the detected end of a scene is reached in the media asset player, the media asset may optionally pause automatically until the user resumes playback. This allows the user to finish any annotations before continuing into to the next scene, at which point relevant media asset content might have disappeared from the media asset. After a scene ends and the user resumes the media asset, the user's annotations are saved and then removed from the media asset canvas area and separate/adjacent notetaking area by default. The user can also choose to keep the annotations on the screen for the next scene. Alternatively, the user can choose to have the annotations from the previous scene removed without saving them. Upon pausing at the end of a scene, a "preview" of the subsequent scene may be displayed (for example, an early frame from the next scene displayed in an inset or as a transparent overlay) to help inform the user's decision about whether to have their annotations from the previous scene persist into the new scene or be removed. At any time while watching the media asset, the user can create a "snapshot" of the current media asset and annotation state, such that the current frame and annotations become an additional page of the static document that will be produced. As with automatically detected scene transitions, in this situation the user may choose to have their annotations persist after this point or be removed.

In some embodiments, before, during, or after watching the media asset, the system can export the chosen (by automatic image analysis or manually by the user) summary frames of the media asset as a static or dynamic document (for example, a PDF file, digital slideshow, GIF, or one or more shorter media asset clips), with or without their own annotations added. The annotations may be superimposed on the media asset frames themselves, and/or added to a separate area of the summary document (for example, if the annotations were added to an entry area separate from the media asset player, such as an adjacent text entry box).

In some embodiments, when the user plays the same media asset an additional time after annotating it in some way, they can choose to have any annotations appear while the media asset plays as they did when they were first added (possibly in modified, recombined, or partial forms). They can also modify or add to the existing annotations at this time. During playback of a previously annotated media asset, similar to the overlay or other cues that indicate the future locations of media asset content, visual or other cues may additionally indicate the future locations of any annotations.

In some embodiments, user interface elements on or near the media asset player indicate the timing of scene transitions or, more broadly, "boundary events" that will be associated with the user's annotations. As one example, tick marks may be added to the media asset playback time bar. In this example, the user can move the tick marks to modify the temporal positioning of the boundary events, remove tick marks to remove unwanted boundary events, or add new tick marks to create additional boundary events.

In some embodiments, after a media asset has been annotated using the system, the annotated media asset, the annotations added by the user, and/or condensed summaries of the media asset may be shared with others (for example, through an online platform). This feature might be used by instructors who aim to customize and augment existing media asset content and share it with their students. The feature might also be used by students to share annotations with their instructors or other students, perhaps using media asset annotation to ask questions or highlight concepts that require clarification, or perhaps as a medium by which instructors can assess their students' understanding of content in a media asset.

Figure 6:
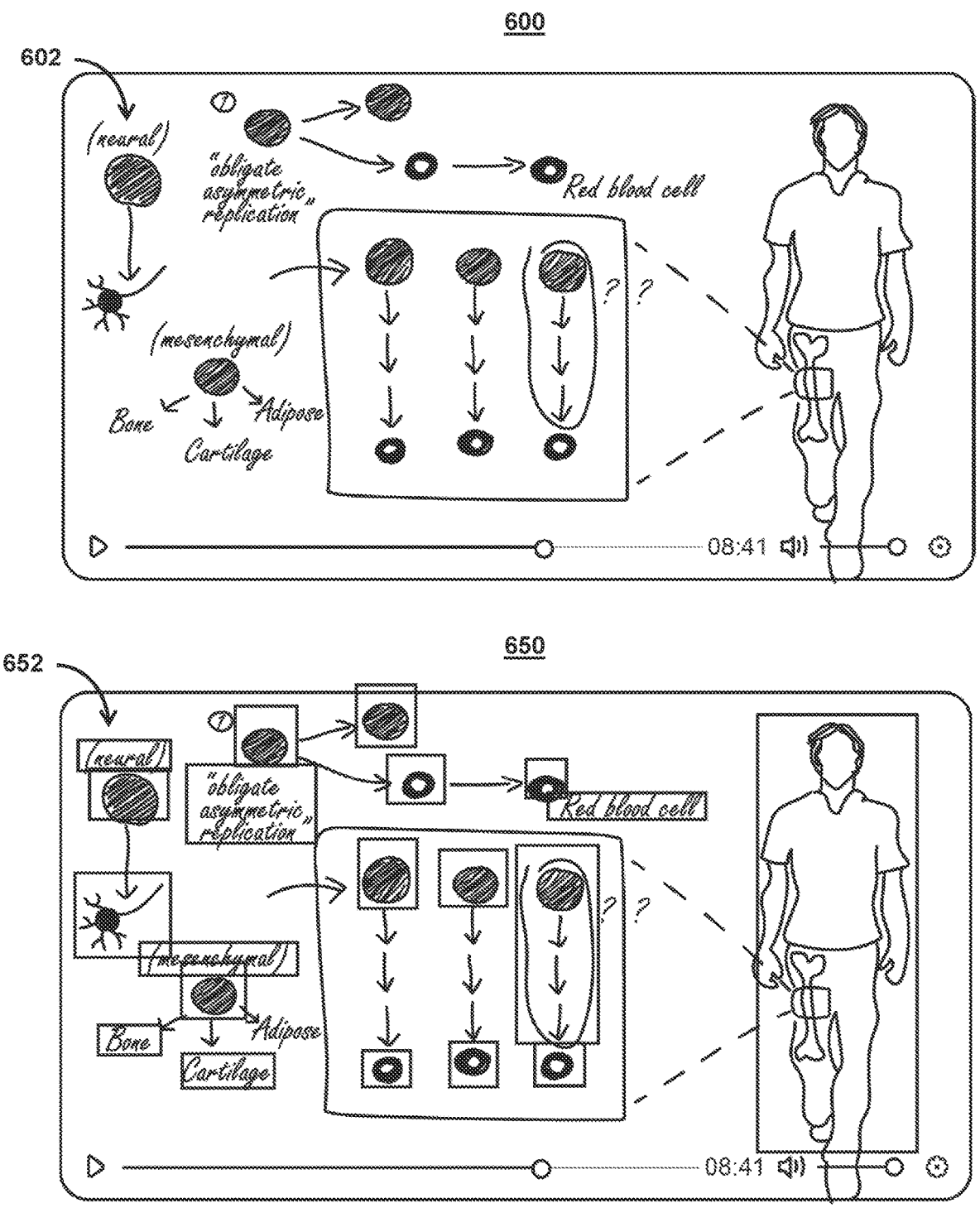
FIG. 6 shows exemplary user interfaces of a system for providing object detection in media assets, in accordance with one or more embodiments.

FIG. 6 shows exemplary user interfaces of a system for providing object detection in media assets, in accordance with one or more embodiments. For example, frame 600 may represent a frame of a media asset (e.g., media asset 102 (FIG. 1)). Either in real-time or prior to generating for display the media asset, the system may detect objects in frames of the media asset. The system may then identify and/or tag these objects. For example, the system (e.g., via model 400 (FIG. 4)) may label object automatically in order to create searchable text. In some embodiments, the system may first identify an object (e.g., a graphic in a frame), determine a label for the object (e.g., "a red blood cell"), and include the label in metadata for the object. Accordingly, the system may then allow a user to search for the text "red blood cell," even though the text does not appear in the media asset. In response to detecting the label in the metadata, the system may return the frame, frame transition scene, media asset and/or truncated version of the media asset.

For example, as shown in frame 650, the system may identify and/or tag each object in frame 650 (as shown by location 652 surrounding object 602 in frame 650. For example, the system may label a first object identified in the first frame and a second object identified in the second frame, respectively, with a determined location and/or other information. This information may then be used to search the content of the media asset (e.g., via a word search) and/or link this information to supplemental content (e.g., as described in FIG. 7 below).

For example, frame 650 may show bounding boxes generated from frame 600 by an object localization algorithm and text recognition algorithm (e.g., as described above in FIG. 4 and below in FIG. 8). The system may associate each bounding box with one or more video playback timestamps, indicating when in the media asset (e.g., media asset 102 (FIG. 1)) the objects they contain first appeared or were modified. The timestamps are inferred based on metadata from the annotation guidance algorithm (e.g., as described in FIG. 11 below).

In some embodiments, object identification may be performed automatically or manually. For example, the first content and the second content may comprise a first tag, generated based on a crowd-sourced review of the first frame, and a second tag, generated based on a crowd-sourced review of the second frame, respectively. For example, in response to a user selecting object 602, the system may receive a user input describing the object. This description may be stored as metadata for the media asset and/or truncated version of the media asset. Alternatively or additionally, the first content and the second content may comprise data related to a first pixel in the first frame and a second pixel in the second frame, respectively, as automatically determined. In some embodiments, the system may additionally or alternatively based object detection on transcription data of audio related to a frame, keywords in the frames, and/or other data.

Figure 7:
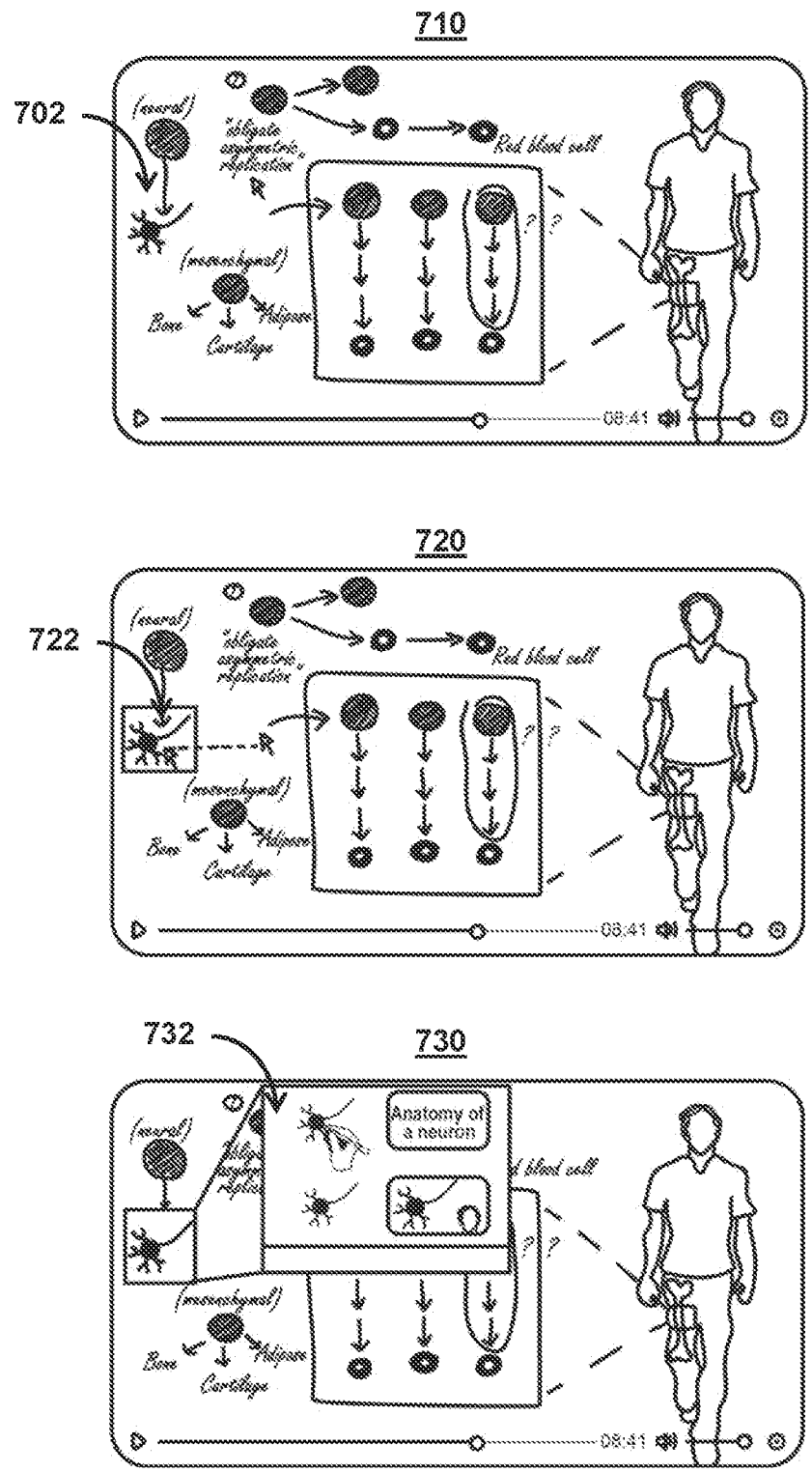
FIG. 7 shows exemplary user interfaces of a system for providing supplemental content related to media assets, in accordance with one or more embodiments.

FIG. 7 shows exemplary user interfaces of a system for providing supplemental content related to media assets, in accordance with one or more embodiments. For example, frame 710 includes object 702. Object 702 may represent an object that was previously detected (e.g., as described in FIG. 6 above). Object 702 may include any graphical or textual information.

In frame 720, the system receives a user selection of bounded object 722, which may be a region and/or object corresponding to object 702. For example, the system may generate a boundary of bounded object 722 and display the boundary to indicate that the bounded object 722 is selectable. The system may receive the selection of bounded object 722 via an on-screen cursor or other selection mechanism. In some embodiments, this may be done in response to a user selecting the object (e.g., as described in FIG. 6 above). Alternatively or additionally, the system may automatically match an object in response to detecting a word (or other audio information) that is presented when the object appears in the frame.

In response to the user selection of bounded object 722, the system has generated supplemental content 732 as shown in frame 730. The supplemental content may include information retrieved from one or more remote sources (e.g., via the Internet). In some embodiments, the system may store links and/or metadata related to supplemental content at a remote server (e.g., a component of system 300 (FIG. 3)).

In some embodiments, the supplemental content may appear as further recommendations for a user. For example, the system may provide the supplemental content as video features that include written/typed text, drawings/other graphics (e.g. images and shapes), sounds, spoken words, or any other sensory cues presented to the user as part of the video. Video features may also include any form of annotations added by the user (e.g., as discussed above). For example, while the system plays back a media asset (e.g., media asset 102 (FIG. 1)), the system may receive a user selection (e.g., via a cursor click, mouse-over, tap, or otherwise) selecting any object that appears in the video, related annotations, or derivative content (e.g. a truncated version of the media asset or a transcript of audio accompanying video) to receive background information, prerequisite knowledge, or other information related to what is selected.

The system may determine this information is provided or suggested by certain recommendation algorithms. In some embodiments, these recommendation algorithms directly utilize internet search engines or themselves function similarly to internet search engines within the entire internet or within the app environment (possibly including any shared content in the app environment). The video features or derivatives of them act as search terms for the recommendation algorithms. In some embodiments, these recommendation algorithms may customize the provided recommendations using any combination of user age, education level, stated or predicted educational goals, stated or predicted interests, stated or predicted desired level of challenge, stated or predicted learning style preferences, other stated or predicted preferences, and/or any other information about the user available to the algorithms.

In some embodiments, a variety of technologies may be used to identify supplemental content and generate derivative search terms to be used by recommendation algorithms. For example, the system may receive a text transcription of audio that accompanies a media asset and may identify one or more words from the transcript to be used as text search terms. In some embodiments, other audio processing algorithms may be employed to generate search terms from non-verbal auditory features (for example, specific bird calls in a nature video). In some embodiments, a text recognition, localization, and reading algorithm is applied to video frames or elements of summary documents, such that one or more words from written or typed text presented visually in the video can be used as search terms for recommendation algorithms. In some embodiments, an image segmentation, object recognition, object localization, and/or other computer vision algorithm(s) may be used to identify and/or spatially/temporally localize visual content, such as drawings, shapes, images, or other graphics, to be used as search terms. In some embodiments, the system may present a user interface (e.g., user interface 100 (FIG. 1)) that relates a selected video feature to other video features that occur near the same time, such that the system may receive user selection of these related features as search terms for recommendation algorithms. In one set of such embodiments, the time of appearance or modification of visual video features is estimated using video metadata generated by an algorithm similar to algorithms described below, and the system may use this temporal information in generating search terms for recommendation algorithms.

In some embodiments, the time of appearance or modification of visual video features is used by the system to determine what a narrator or instructor was saying (or what other auditory or visual features were present in video and/or annotation content) near the same playback time. In some embodiments, the system is able to specify additional video features not automatically recognized by audio analysis, computer vision, or other algorithms to be used as search terms or in the generation or selection of search terms for recommendation algorithms. In some embodiments, the additional content specified by the user may be used by the system as training data to improve machine learning-based algorithms that identify content (e.g., as described in FIG. 4 above). In some embodiments, additional content specified by the user may be crowd-sourced or shared among users in any number of ways such that users may benefit from other users' input to the system.

In some embodiments, specific words from transcripts or from visually recognized or other related text may be emphasized (e.g. by highlighting or underlining) and/or exclusively enabled in some way based on their suitability to act as search terms for recommendation algorithms. For example, the system may limit selectable search terms to verbs and nouns only with certain exceptions. Similarly, in some embodiments, specific graphics or any other content may be emphasized (e.g. by highlighting, by presence or alteration of a bounding box, by increasing audio volume for audio features, etc.) and/or exclusively enabled based on their suitability to act as search terms for recommendation algorithms.

In one embodiment, the system may generate bounding boxes during media asset playback around objects identified by an object localization algorithm (e.g., including algorithms that do not necessarily carry out object recognition) applied to frames or frames from a truncated media asset. The system may search through metadata created by an algorithm (e.g., as described in FIG. 11 below) to determine the time(s) at which the graphics appeared or were modified.

The system may use an additional computer vision algorithm to determine times at which the graphic was highlighted, moused-over with a cursor, or otherwise emphasized in a way that is not detectable by an algorithm (e.g., as described in FIG. 11 below). When the system detects that, the user selects an automatically generated bounding box, the system may present a segment of a transcript of the audio accompanying the media asset corresponding to the time at which the graphics in the bounding box appeared or were modified. The system may then receive user selection of certain words or phrases from the transcript, and these or others that are selected manually may be used by the system as search terms for recommendation algorithms. If the user wishes to use a graphic that was not automatically recognized/segmented to generate search terms in this manner, the system may allow the user to draw a custom bounding box to specify a particular graphic as a video feature, after which point an algorithm (e.g., as described in FIG. 11 below) and its resulting metadata and the transcript may be matched as described above, such that the system can receive recommendations in the same way as if the bounding box had been generated automatically. The system may then use the custom bounding boxes drawn by the user to generate training data (e.g., as described in FIG. 4 above) for the algorithm(s) that generate bounding boxes for suitable graphics automatically.

Figure 8:
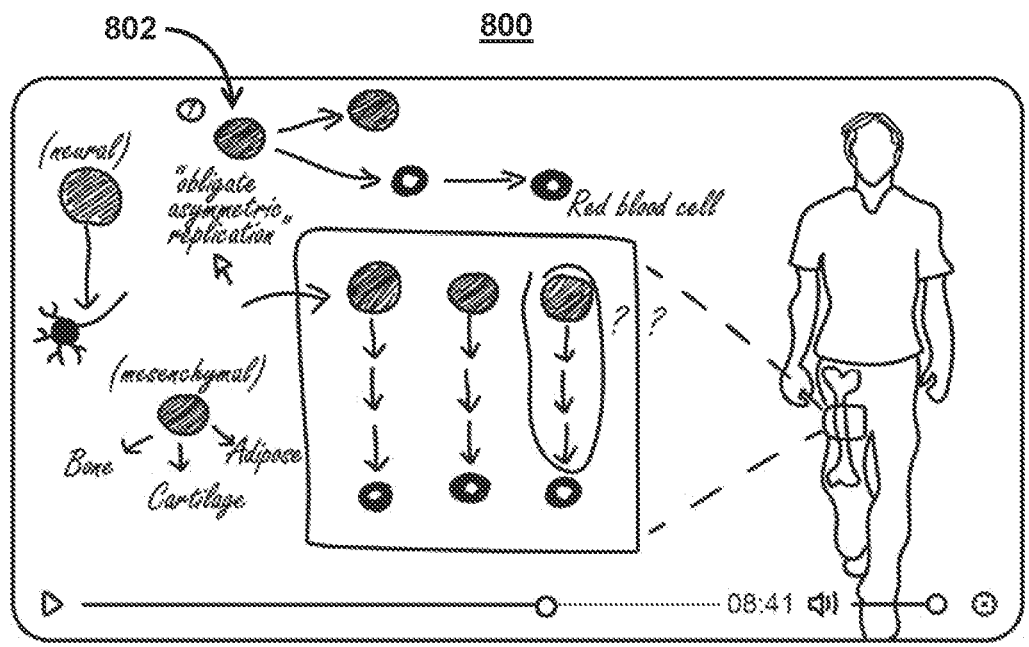
FIG. 8 shows exemplary user interfaces of a system for identifying objects in media assets, in accordance with one or more embodiments.
Figure 8:
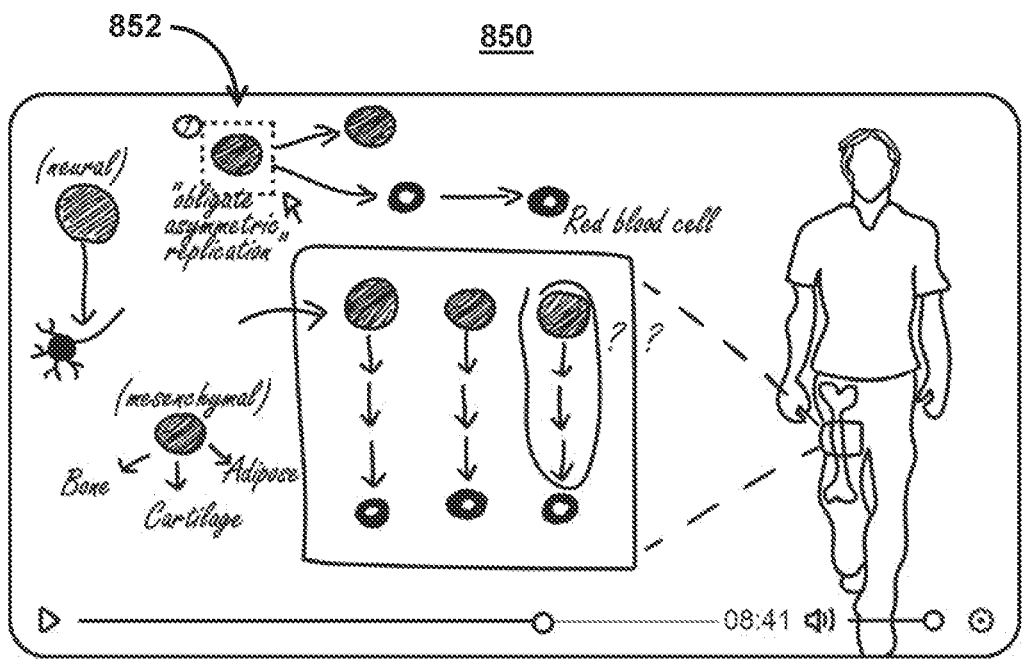

FIG. 8 shows exemplary user interfaces of a system for identifying objects in media assets, in accordance with one or more embodiments. For example, as shown in FIG. 8, the system may receive user selection identifying and/or refining object selections.

For example, as shown in FIG. 8, frame 800 may include object 802. As shown in frame 850, the system may receive a user selection identifying object 802 at location 852. The user selection may further include a user selecting boundaries of location 852 and/or may also include receiving metadata related to object 802 (e.g., a user provided description of object 802). As described above in FIGS. 6-7, the system may also receive metadata describing the object, which may be stored for subsequent use (e.g., in order to create searchable, truncated versions of the media asset).

Figure 9:
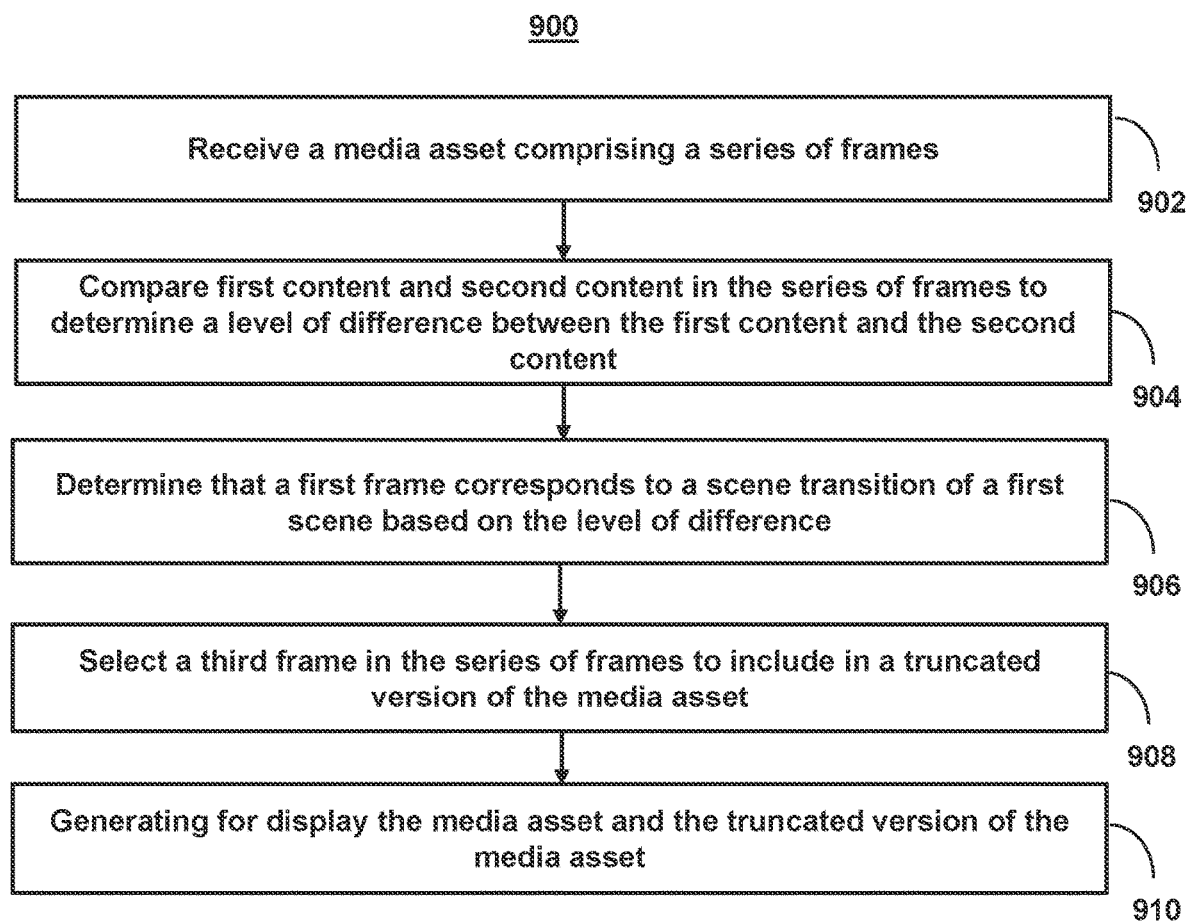
FIG. 9 shows a flowchart of the steps involved in generating truncated media assets, in accordance with one or more embodiments.

FIG. 9 shows a flowchart of the steps involved in generating truncated media assets in accordance with one or more embodiments. For example, the system may use process 900 to generate truncated versions of media assets as described in processes described in FIGS. 10-12.

At step 902, process 900 receives (e.g., via one or more components of system 300 (FIG. 3)) a media asset comprising a series of frames. The system may then iteratively extract frames based on a predetermined frame skip parameter (e.g., extract every 5 frames, every 10 frames, etc.).

At step 904, process 900 compares (e.g., via one or more components of system 300 (FIG. 3)) first content and second content in the series of frames to determine a level of difference between the first content and the second content. For example, the system may compare first content presented to a user at a first frame in the series of frames and second content presented to the user at a second frame in the series of frames to determine a level of difference between the first content and the second content.

For example, in some embodiments, the first content and the second content may comprise data related to a first pixel in the first frame and a second pixel in the second frame, respectively. For example, the data may comprise differences in pixels in images associated with the frames. For example, in some embodiments, the first content and the second content may comprise first transcription data of audio related to the first frame, and a second transcription data of audio related to the second frame, respectively. For example, the data may comprise differences in words (e.g., in subtitles, transcripts, etc.) related to the frames. The system may analyze this information and/or other information to determine the content of a frames. (e.g. the system may detect the end of a sentence by prosody analysis of audio).

For example, in some embodiments, the first content and the second content may comprise a first theme cluster of a first keyword corresponding to the first frame, and a second theme cluster of a second keyword corresponding to the second frame, respectively. For example, the data may comprise differences in keywords and/or theme clusters of keywords (e.g., as determined by a machine learning model as described in FIGS. 3-4) associated with the frames.

For example, in some embodiments, the first content and the second content may comprise a first object identified in the first frame and a second object identified in the second frame, respectively. For example, the data may comprise differences in objects (e.g., as determined by a machine learning model as described in FIGS. 3-4 and/or as described in FIGS. 6-8) associated with the frames.

For example, in some embodiments, the first content and the second content may comprise a first tag, generated based on a crowd-sourced review of the first frame, and a second tag, generated based on a crowd-sourced review of the second frame, respectively. For example, the data may comprise differences in the content and/or selections (e.g., as determined by a plurality of users tasked with tagging and/or indexing frames in media assets with labels describing the content of the frames) associated with the frames. In some embodiments, the first content and the second content comprises a first tag generated based on a crowd-sourced review of the first frame and/or frames in proximity to it within the media asset, and/or a second tag generated based on a crowd-sourced review of the second frame and/or frames in proximity to it within the media asset, respectively. For example, the system may generate a tag for one frame corresponding to each scene of the media asset (e.g., users may directly tag a frame by screenshotting it while accessing the media asset.

At step 906, process 900 determines (e.g., via one or more components of system 300 (FIG. 3)) that a first frame corresponds to a scene transition of a first scene based on the level of difference. For example, the system may determine that the first frame corresponds to a scene transition of a first scene based on the level of difference.

At step 908, process 900 selects (e.g., via one or more components of system 300 (FIG. 3)) a third frame in the series of frames to include in a truncated version of the media asset. For example, the system may, in response to determining that the first frame corresponds to the scene transition of the first scene, select a third frame (e.g., a summary frame) in the series of frames to include in a truncated version of the media asset based on the third frame appearing in the series of frames a predetermined number of frames from (e.g., earlier or later than) the first frame (e.g., in the series of frames). In some embodiments, the system may select the third frame based on the third frame being the same as the first frame or having substantially the same content. For example, the system may modify the selection of the scene transition frame based on the sensitivity of the thresholding method used.

At step 910, process 900 generates (e.g., via one or more components of system 300 (FIG. 3)) for display the media asset and the truncated version of the media asset. For example, the system may generate for simultaneous display, on a local device, the media asset in a first portion of a user interface, and the third frame in a second portion of the user interface, wherein the second portion of the user interface corresponds to the truncated version, and wherein the third frame represents the first scene in the truncated version. For example, the system may receive a first user input selecting playback of the media asset. The system may then play back the media asset in the first portion. The system may also graphically accentuate the second frame in the second portion when a point of playback of the media asset corresponds to the second frame.

The system may also provide additional features that generate supplemental content and/or modified playback of the media asset. For example, the system may determine a frame in the media asset currently displayed in the first portion is a final frame in a currently displayed scene. The system may then automatically pause playback of the media asset in the first portion based on determining the frame in the media asset currently displayed in the first portion is the final frame in the currently displayed scene.

In some embodiments, the third frame (e.g., the summary frame) in the truncated version may also include any user annotations applied to any frames with a given scene. The annotations for the frames in a given scene may be aggregated and displayed on the respective summary frame in the truncated version of the media asset.

It is contemplated that the steps or descriptions of FIG. 9 may be used with any other embodiment of this disclosure. In addition, the steps and descriptions described in relation to FIG. 9 may be done in alternative orders, or in parallel to further the purposes of this disclosure. For example, each of these steps may be performed in any order, or in parallel, or substantially simultaneously to reduce lag or increase the speed of the system or method. Furthermore, it should be noted that any of the devices or equipment discussed in relation to FIGS. 1-8 could be used to perform one or more of the steps in FIG. 9.

Figure 10:
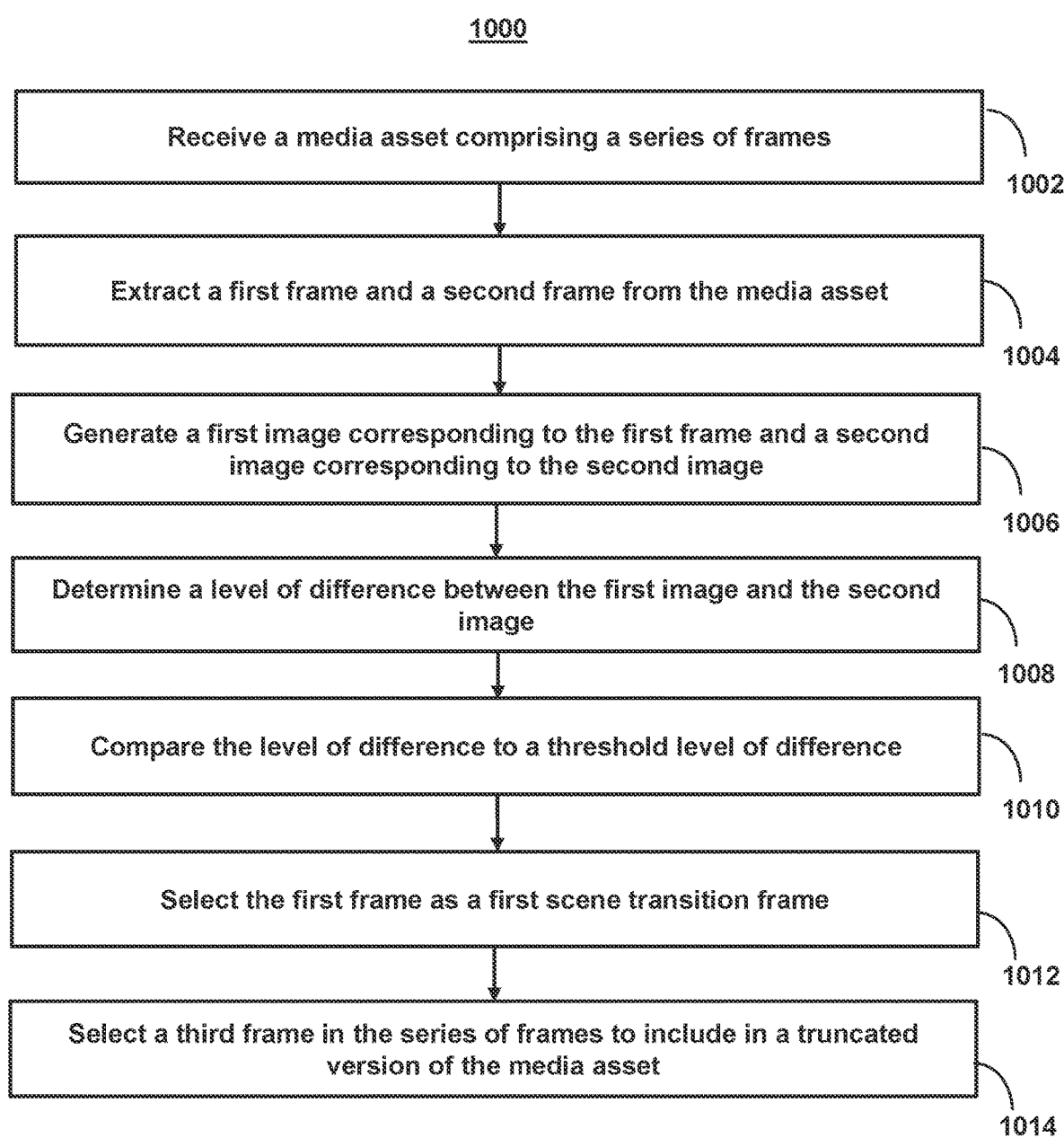
FIG. 10 shows a flowchart of the steps involved in content-preserving scene recognition in media assets, in accordance with one or more embodiments.

FIG. 10 shows a flowchart of the steps involved in content-preserving scene recognition in media assets, in accordance with one or more embodiments. For example, the system may use process 1000 to determine a scene transition frame as described in the processes of FIGS. 9 and 11-12. For example, many educational media assets consist of digital blackboard "canvases" on which an instructor writes or draws using a digital stylus or other input device, adds typed text, and/or adds additional pre-generated graphics. These media assets are termed herein as "blackboard teaching media assets." In many of these media assets, a consistent pattern emerges where content (handwriting, drawings, images, etc.) is progressively added to the canvas until some form of conclusion is reached, at which time either (a) some or all of the content is removed from the canvas to make room for more content, or (b) the media asset ends. For example, a science instructor might write out the steps of a mathematical calculation, or draw out a biochemical pathway, and then start over with a blank canvas in the same media asset to illustrate additional concepts. Alternatively, the instructor might erase part of the pathway/calculation, but re-use some (but not all) of the content on the screen to illustrate a new concept. Immediately prior (on the media asset timeline) to such a partial or complete erasure, several media asset frames tend to contain a complete record of all of the content added to the canvas during the present scene before the erasure occurred. The described algorithm saves one "scene-ending frame" from each of these scene transitions ("erasures") as one page of a static PDF (or similar) document, providing a highly condensed representation of the visual content of the media asset. Additionally/alternatively, the times/indices of the scene-ending frames can be stored and used for media asset annotation (as described above). Because, ideally, the disappearance of even a modest amount of content results in the detection of a "transition," and a frame prior to this transition, being saved, the algorithm is referred to as "content-preserving". In one simple but common case, a media asset consists of a series of static slides—content that disappears may be instantaneously replaced by the content of the next slide. An important complicating factor that this algorithm needs to account for is that, in general, content can disappear (be erased) from the canvas in a variety of ways, for example, disappearing instantaneously, being instantaneously replaced by other content (as in a slideshow-style media asset), being removed gradually (e.g.) by an eraser tool in a drawing program, fading out, panning down/up/across the canvas, and/or zooming in/out Scene transition analysis is also complicated by the common presence of a drawing/writing cursor or mouse icon, which often moves about the canvas, appearing and disappearing frequently—the algorithm should not interpret such movements/disappearances of the cursor as the end of a scene. Additionally, a very small erasure will sometimes be made to quickly correct a mistake, and, optimally, this small disappearance of content is also ignored by the algorithm.

At step 1002, process 1000 receives (e.g., via one or more components of system 300 (FIG. 3)) a media asset comprising a series of frames. For example, the system may receive a media asset comprising a series of frames. The system may then iteratively extract frames based on a predetermined frame skip parameter (e.g., extract ever 5 frames, every 10 frames, etc.).

At step 1004, process 1000 extracts (e.g., via one or more components of system 300 (FIG. 3)) a first frame and a second frame from the media asset. For example, the system may extract a first frame and a second frame from the media asset, wherein the second frame is subsequent to the first frame in the series of frames. For example, the system may repetitively extracts individual frames from the media asset in sequence from beginning to end, possibly skipping some number of frames with each advancement. For example, if the "frame skip" parameter is set to 1 second, and the video runs at 15 frames per second, the algorithm will process the 1st frame, then the 16th frame, then the 31st, etc. For example, skipping frames improves the speed and efficiency of the algorithm, and accentuates the signal of any erasures that may occur (e.g. a slow fading, panning, or zooming transition might show very subtle differences between adjacent frames, but large differences between frames spaced 1 second apart)

At step 1006, process 1000 generates (e.g., via one or more components of system 300 (FIG. 3)) a first image corresponding to the first frame and a second image corresponding to the second frame. For example, the system may generate, using an edge detection operation, a first image corresponding to the first frame, and a second image corresponding to the second frame.

In some embodiments, the system may then convert the first frame and the second frame to respective grayscale representations. The system may then determine whether the first frame and the second frame require resizing. The system may resize the first frame and the second frame in response to determining that the first frame and the second frame requiring resizing.

For example, the system may preprocess each frame. In such cases, the color frame may be converted to a grayscale representation. The frame may be resized to 265×144 pixels (width×height), if it is not already this size. The system may perform an edge detection operation (e.g., Canny edge detection or other edge detection) on the frame, resulting in a binary image where "1" values indicate the locations of edges (an "edges-only" image). If a binary image is not the immediate result of the edge detection algorithm, a binary threshold is applied to the resulting image to convert it to binary form.

At step 1008, process 1000 determines (e.g., via one or more components of system 300 (FIG. 3)) a level of difference between the first image and the second image. For example, the system may determine a level of difference between the first image and the second image.

For example, the system may generate the difference comprises subtracting edge pixel values of the second image from respective edge pixel values of the first image to generate a set of new pixel values. For example, The edges-only image from the current frame may be subtracted (standard element-wise matrix subtraction) from the edges-only image from the most recently processed previous frame (which is saved during the frame processing loop), resulting in a new image matrix that has "1" values where an edge pixel has disappeared (in the current frame relative to the previous frame), "−1" values where a new edge pixel has appeared, and "0" where no change has occurred (an edge pixel might be present or absent in both frames). All negative values in the matrix from the previous step are set to zero. The remaining positive values may represent disappearances of detected edge pixels.

The system may further process the level of difference using a blurring, filtering, or dilation operation. For example, a Gaussian blurring operation with a kernel size of 11 may be applied to the image resulting from the previous step, and a binary threshold is applied to the blurred image. This step helps to remove noise resulting from edges being displaced slightly between sequential video frames.

At step 1010, process 1000 compares (e.g., via one or more components of system 300 (FIG. 3)) the level of difference to a threshold level of difference. For example, the system may compare the level of difference to a threshold level of difference. For example, the system may determine a number of edge pixels that have been removed in the second image relative to the first image, wherein comparing the level of difference to the threshold level of difference comprises comparing the number to a threshold number. The classification of presence or absence of an erasure/scene transition can be made by a global threshold of the image from the previous step (whether or not the count of positive pixels in the resulting image exceeds a threshold value).

At step 1012, process 1000 selects (e.g., via one or more components of system 300 (FIG. 3)) the first frame as a first scene transition frame. For example, the system may select the first frame as a first scene transition frame in response to determining that the level of difference equals or exceeds the threshold level of difference.

At step 1014, process 1000 selects (e.g., via one or more components of system 300 (FIG. 3)) a third frame in the series of frames to include in a truncated version of the media asset. For example, the system may select a third frame in the series of frames to include in a truncated version of the media asset based on the third frame appearing in the series of frames a predetermined number of frames earlier than the first frame in response to determining that the first frame corresponds to the first scene transition frame.

For example, if the result from the previous thresholding step is "positive" (a transition has occurred), a frame prior to the frame currently being analyzed will be selected as a "scene transition frame" that preserves the content from the previous scene. The chosen frame is selected from a time some margin before the detected transition because this avoids the possibility of a scene-ending frame being selected in which the transition has already begun to occur on a subthreshold scale (for example, in a fade-out transition, without the margin technique there is a chance that the selected frame would be very slightly faded). The system may use a margin of about 2-3 seconds has been found to be sufficient for this purpose—anecdotally, meaningful content is rarely added in the final 2 seconds of a scene.

For example, the system may generate for simultaneous display, on a local device, the media asset in a first portion of a user interface and the third frame in a second portion of the user interface, wherein the second portion of the user interface corresponds to the truncated version, and wherein the third frame represents a first scene in the truncated version.

In some embodiments, the system may limit the amount of scene transitions. For example, the system may determine a first and a second scene transition frame. The system may then determine a frequency of scene transitions in a time period based on the first scene transition frame and the second scene transition frame. The system may then compare the frequency to a threshold frequency. The system may select a fourth frame in the series of frames to include in the truncated version of the media asset based on the fourth frame appearing in the series of frames the predetermined number of frames earlier than the second scene transition frame in response to determining that the frequency does not equal or exceed the threshold frequency. For example, if a large number of apparent erasures/scene transitions are detected with high density in time (beyond a certain threshold), the algorithm rejects the video since it is likely incompatible with this type of analysis. This occurs with videos featuring live video camera footage or extended animation sequences. When a video is found to be incompatible, it may be passed to a separate scene detection algorithm for analysis (e.g. a more standard algorithm based on HSV color thresholding). Additionally or alternatively, the video processing algorithm may be able to isolate compatible sections of videos, applying different algorithms to different sections.

In some embodiments, prior to process 900, a first pass is made through the media asset by the system to estimate various statistical properties of the media asset as a whole as related to the parameters of the algorithm. These statistical properties are used to calculate optimal parameters (e.g. threshold values) for each individual media asset to be used in each of the processing steps, thus helping to ensure good class separation of scene transitions from sub-threshold events.

If many apparent erasures are detected within a short time period (indicating possible incompatibility of the media asset with the algorithm), the system may assess the spatial distribution of the pixel disappearances that caused the scene transition detections. In some cases, a blackboard teaching media asset or slideshow-style media asset with otherwise clear scene transitions will be accompanied by an inset with camera footage of the instructor speaking—constant individual pixel variations within the footage area may cause erasures to be falsely detected. In such cases, the system may make a second pass through the video, this time ignoring any "disappearances" from the identified spatial region in the media asset.

In some embodiments, spatial pixel density mapping techniques may be applied to the image following the edge subtraction to make the algorithm more sensitive to a spatially concentrated disappearance of edges than to widespread, sparse edge pixel disappearances due to random noise that may add up to a super-threshold global pixel count.

It is contemplated that the steps or descriptions of FIG. 10 may be used with any other embodiment of this disclosure. In addition, the steps and descriptions described in relation to FIG. 10 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1-8 could be used to perform one or more of the steps in FIG. 10.

Figure 11:
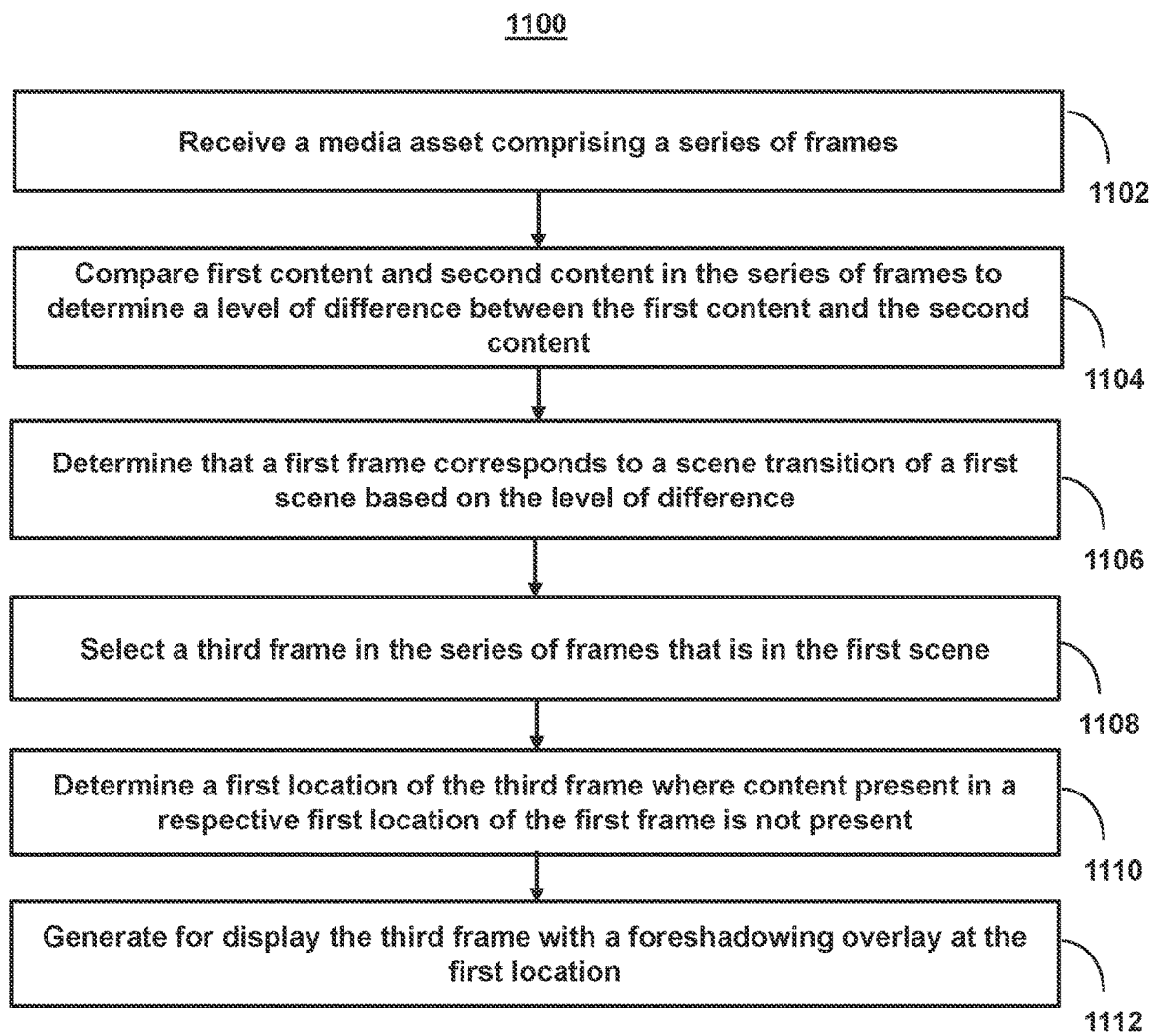
FIG. 11 shows a flowchart of the steps involved in providing annotation guidance for media assets, in accordance with one or more embodiments.

FIG. 11 shows a flowchart of the steps involved in providing annotation guidance for media assets, in accordance with one or more embodiments. For example, the system may use process 1100 to provide annotation guidance based on truncated versions of media assets as described in the processes of FIG. 9-10 or 12. As stated above, a common pattern in educational media assets is such that content is progressively added to a digital canvas during a scene before being partially or completely erased, zoomed or panned away from, faded out, etc. (in the case of the erasure detection algorithm, even a partial erasure may be detected as a scene transition). In response, the system generates an animated overlay (to be superimposed on the media asset while it is playing) that indicates locations in the media asset canvas where content will appear or will not appear prior to the next detected erasure/scene transition in the media asset.

At step 1102, process 1100 receives (e.g., via one or more components of system 300 (FIG. 3)) a media asset comprising a series of frames. For example, as described in step 1002 (FIG. 10)), the system may receive a media asset comprising a series of frames. The system may then iteratively extract frames based on a predetermined frame skip parameter (e.g., extract ever 5 frames, every 10 frames, etc.).

At step 1104, process 1100 compares (e.g., via one or more components of system 300 (FIG. 3)) first content and second content in the series of frames to determine a level of difference between the first content and the second content. For example, the system may compare first content presented to a user at a first frame in the series of frames and second content presented to the user at a second frame in the series of frames to determine a first level of difference between the first content and the second content.

At step 1106, process 1100 determines (e.g., via one or more components of system 300 (FIG. 3)) that a first frame corresponds to a scene transition of a first scene based on the level of difference. For example, the system may determine that the first frame corresponds to scene transition of a first scene based on the first level of difference. In some embodiments, the system may use the process and/or one or more steps of process 1000 (FIG. 10). For example, the system may convert the first frame and the second frame to respective grayscale representations. The system may determine whether the first frame and the second frame require resizing. In response to determining that the first frame and the second frame requiring resizing, the system may resize the first frame and the second frame. The system may also subtract edge pixel values of the second image from respective edge pixel values of the first image to generate a set of new pixel values.

In some embodiments, the system may pre-process each frame. For example, the system may convert a color frame to grayscale. The system may perform an edge detection operation (e.g., Canny edge detection) on the frame, resulting in a binary image where "1" values indicate the locations of edges (an "edges-only" image). If a binary image is not the immediate result of the edge detection algorithm, a binary threshold is applied to the resulting image by the system to convert it to binary form. The system may also perform a dilation operation on the binary image. Thus, the edge lines may be increased in width, and gaps in between nearby edges are filled in as they start to overlap. The system may also down-sample the binary image (e.g., using bicubic interpolation).

At step 1108, process 1100 selects (e.g., via one or more components of system 300 (FIG. 3)) third frame in the series of frames that is in the first scene. For example, the system may select a third frame in the series of frames that is in the first scene in response to determining that the first frame corresponds to the scene transition of the first scene. In some embodiments, the same pre-processing sequence outlined in the previous step may also performed on the scene transition frame from the current scene, with the scene transition frame having been chosen by, e.g., process 1000 (FIG. 10), or by some other scene detection algorithm.

At step 1110, process 1100 determines (e.g., via one or more components of system 300 (FIG. 3)) a first location of the third frame where content present in a respective first location of the first frame is not present. For example, the system may determine a first location of the third frame where content present in a respective first location of the first frame is not present.

For example, the pre-processed image of the current frame may be subtracted from the pre-processed image of the scene-ending frame by the system. Any negative values in the resulting matrix are set to zero. Effectively, this results in a binary image where "1" values represent locations where content present in the scene transition frame is not present in the current frame (i.e. content that will be added later in the current scene). The resulting binary image may then be enlarged to be the same size as the original media asset frames. The color, brightness, and/or transparency of the overlay may be adjusted.

At step 1112, process 1100 generates (e.g., via one or more components of system 300 (FIG. 3)) for display the third frame with a foreshadowing overlay at the first location. For example, the system may generate for display, on a local device, the third frame with a foreshadowing overlay at the first location.

In some embodiments, the system may also generate whitespace overlays, which may indicate areas where users may add annotations for frames in a scene. For example, the system may determine a second location of the third frame where no content is present and where no content is present in a respective second location of the first frame. The system may then generate for display, on a local device, the third frame with a whitespace overlay at the second location.

In some embodiments, after initial generation of the foreshadowing overlay for each frame, the system may also apply "temporal smoothing" to the overall foreshadowing overlay for the media asset. For example, the foreshadowing overlay may appear as a selection of large squares/rectangles arranged in a grid. As content is added to the scene, the system may have rectangles in the corresponding locations disappear (e.g., one by one) to avoid interfering with content that is being added. Due to noise, cursor movement, or other artifacts, a square may disappear only to reappear one or more frames later, which can produce an undesirable flickering effect. The system may apply a temporal smoothing algorithm to remove the signal from any disappearance of a foreshadowing overlay if it is closely followed (within some time threshold) by a reappearance of a foreshadowing overlay in the same location.

Additionally, it may be distracting or aesthetically dissonant when relatively large foreshadowing segments disappear suddenly from the foreshadowing overlay. To remedy this, the system may temporally "blur" the foreshadowing overlay such that foreshadowing segments fade in and out gradually instead of simply appearing and disappearing.

It is contemplated that the steps or descriptions of FIG. 11 may be used with any other embodiment of this disclosure. In addition, the steps and descriptions described in relation to FIG. 11 may be done in alternative orders, or in parallel to further the purposes of this disclosure. For example, each of these steps may be performed in any order, or in parallel, or substantially simultaneously to reduce lag or increase the speed of the system or method. Furthermore, it should be noted that any of the devices or equipment discussed in relation to FIGS. 1-8 could be used to perform one or more of the steps in FIG. 11.

Figure 12:
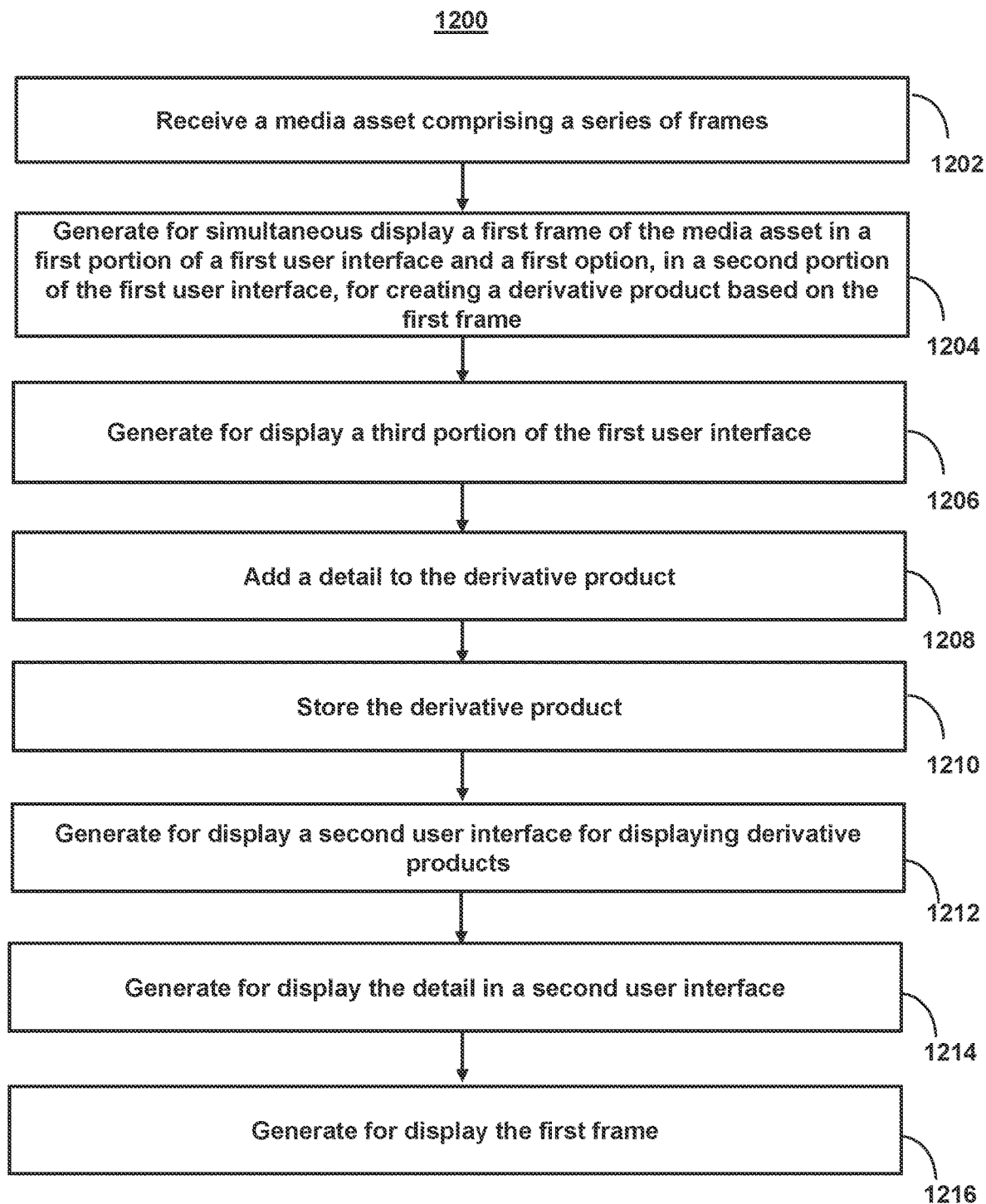
FIG. 12 shows a flowchart of the steps involved generating derivative products based on truncated media assets, in accordance with one or more embodiments.

FIG. 12 shows a flowchart of the steps involved generating derivative products based on truncated media assets, in accordance with one or more embodiments. For example, the system may use process 1200 to generate derivative products based on truncated versions of media assets as described in the processes of FIGS. 9-11. For example, the derivative product may be a virtual flashcard, handout, or other supplemental learning aid.

At step 1202, process 1200 receives (e.g., via one or more components of system 300 (FIG. 3)) a media asset comprising a series of frames. For example, the system may receive a media asset comprising a series of frames. For example, the system may receive a media asset comprising a series of frames. The system may then iteratively extract frames based on a predetermined frame skip parameter (e.g., extract ever 5 frames, every 10 frames, etc.).

At step 1204, process 1200 generates (e.g., via one or more components of system 300 (FIG. 3)) for simultaneous display a first frame of the media asset in a first portion of a first user interface and a first option, in a second portion of the first user interface, for creating a derivative product based on the first frame. For example, the system may generate for simultaneous display, on a local device, a first frame of the media asset in a first portion of a first user interface and a first option, in a second portion of the first user interface, for creating a derivative product based on the first frame, wherein the first portion of the first user interface provides playback functionality for the media asset.

In some embodiments, the derivative product may be based on a truncated version of media assets. For example, the truncated version may be based on extracting a first frame and a second frame from the media asset, wherein the second frame is subsequent to the first frame in the series of frames. The system may then generate, using an edge detection operation, a first image corresponding to the first frame and a second image corresponding to the second frame. The system may determine a level of difference between the first image and the second image. The system may compare the level of difference to a threshold level of difference. The system may, in response to determining that the level of difference equals or exceeds the threshold level of difference, select the first frame as a scene transition frame for a first scene.

At step 1206, process 1200 generates (e.g., via one or more components of system 300 (FIG. 3)) for display a third portion of the first user interface. For example, the system may generate for display a third portion of the first user interface in response to a first user input selecting the first option, wherein the third portion comprises a second option for adding a detail to the derivative product and a third option for storing the derivative product.

At step 1208, process 1200 adds (e.g., via one or more components of system 300 (FIG. 3)) a detail to the derivative product. For example, the system may add the detail to the derivative product in response to a second user input selecting the second option.

At step 1210, process 1200 stores (e.g., via one or more components of system 300 (FIG. 3)) the derivative product. For example, the system may store the derivative product in response to a third user input selecting the third option.

At step 1212, process 1200 generates (e.g., via one or more components of system 300 (FIG. 3)) for display a second user interface for displaying derivative products. For example, the system may generate for display, on the local device, a second user interface for displaying derivative products.

At step 1214, process 1200 generates (e.g., via one or more components of system 300 (FIG. 3)) for display the detail in a second user interface. For example, the system may generate for display the detail in the second user interface and a fourth option for accessing the first frame in response to a fourth user input requesting access to the derivative product.

At step 1216, process 1200 generates (e.g., via one or more components of system 300 (FIG. 3)) for display the first frame. For example, the system may generate for display the first frame in response to a fifth user input selecting the fourth option. In some embodiments, the first frame may include annotations from any frame in the scene. For example, the system may receive respective user annotations to a plurality of frames in the first scene. The system may aggregate the respective user annotations on the first frame based on the first frame being selected as the scene transition frame.

It is contemplated that the steps or descriptions of FIG. 12 may be used with any other embodiment of this disclosure. In addition, the steps and descriptions described in relation to FIG. 12 may be done in alternative orders or in parallel to further the purposes of this disclosure. For example, each of these steps may be performed in any order or in parallel or substantially simultaneously to reduce lag, or increase the speed of the system or method. Furthermore, it should be noted that any of the devices or equipment discussed in relation to FIGS. 1-8 could be used to perform one or more of the steps in FIG. 12.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The present techniques will be better understood with reference to the following enumerated embodiments:

1. A method for truncating media assets, the method comprising: receiving a media asset comprising a series of frames; comparing first content presented to a user at a first frame in the series of frames and second content presented to the user at a second frame in the series of frames to determine a level of difference between the first content and the second content; determining that the first frame corresponds to a scene transition of a first scene based on the level of difference; in response to determining that the first frame corresponds to the scene transition of the first scene, selecting a third frame in the series of frames to include in a truncated version of the media asset based on the third frame appearing in the series of frames a predetermined number of frames earlier than the first frame; and generating for simultaneous display, on a local device, the media asset in a first portion of a user interface, and the third frame in a second portion of the user interface, wherein the second portion of the user interface corresponds to the truncated version, and wherein the third frame represents the first scene in the truncated version.

2. The method of embodiment 1, wherein the first content and the second content comprises data related to a first pixel in the first frame and a second pixel in the second frame, respectively.

3. The method of any proceeding embodiment, wherein the first content and the second content comprises first transcription data of audio related to the first frame and a second transcription data of audio related to the second frame, respectively.

4. The method of any proceeding embodiment, wherein the first content and the second content comprises a first theme cluster of a first keyword corresponding to the first frame and a second theme cluster of a second keyword corresponding to the second frame, respectively.

5. The method of any proceeding embodiment, wherein the first content and the second content comprises a first object identified in the first frame and a second object identified in the second frame, respectively.

6. The method of any proceeding embodiment, wherein the first content and the second content comprises a first tag, generated based on a crowd-sourced review of the first frame, and a second tag, generated based on a crowd-sourced review of the second frame, respectively.

7. The method of any proceeding embodiment, further comprising: receiving a first user input selecting playback of the media asset; playing back the media asset in the first portion; and graphically accentuating the second frame in the second portion when a point of playback of the media asset corresponds to the second frame.

8. The method of embodiment 7, further comprising: receiving a second user input adding an annotation a frame in the media asset currently displayed in the first portion; and automatically pausing playback of the media asset in the first portion based on the second user input.

9. The method of embodiment 8, further comprising: determining a current scene for the frame in the media asset currently displayed in the first portion; continuing to display the annotation on subsequently displayed frames in the current scene; and removing the annotation in response to determining the frames in the current scene are no longer displayed in the first portion.

10. The method of embodiment 9, further comprising: determining a frame in the media asset currently displayed in the first portion is a final frame in a currently displayed scene; and automatically pausing playback of the media asset in the first portion based on determining the frame in the media asset currently displayed in the first portion is the final frame in the currently displayed scene.

11. The method of any proceeding embodiment, wherein comparing the first content and the second content to determine the level of difference between the first content and the second content, further comprises inputting the first frame and second frame into a neural network, wherein the neural network was trained by: inputting a labeled feature input into the neural network, wherein the labeled feature input corresponds to data for a training frame; and training the neural network to classify the data for the training frame as corresponding to a known classification, wherein the known classification corresponds to a known scene.

12. The method of any proceeding embodiment, wherein the neural network was further trained by: receiving data related to user re-classifications of frames classified into scenes by the neural network; and training the neural network based on the user re-classifications.
13. A method for content-preserving scene recognition in media assets, the method comprising: receiving a media asset comprising a series of frames; extracting a first frame and a second frame from the media asset, wherein the second frame is subsequent to the first frame in the series of frames; generating, using an edge detection operation, a first image corresponding to the first frame and a second image corresponding to the second frame; determining a level of difference between the first image and the second image; comparing the level of difference to a threshold level of difference; in response to determining that the level of difference equals or exceeds the threshold level of difference, selecting the first frame as a first scene transition frame; and in response to determining that the first frame corresponds to the first scene transition frame, selecting a third frame in the series of frames to include in a truncated version of the media asset based on the third frame appearing in the series of frames a predetermined number of frames earlier than the first frame.
14. The method of any proceeding embodiment, wherein the first frame and the second frame are extracted based on a frame skip parameter.
15. The method of any proceeding embodiment, further comprising: converting the first frame and the second frame to respective grayscale representations; determining whether the first frame and the second frame require resizing; and in response to determining that the first frame and the second frame requiring resizing, resizing the first frame and the second frame.
16. The method of any proceeding embodiment, wherein generating the difference comprises subtracting edge pixel values of the second image from respective edge pixel values of the first image to generate a set of new pixel values.
17. The method of any proceeding embodiment, further comprising processing the level of difference using a blurring, filtering, or dilation operation.
18. The method of any proceeding embodiment, wherein comparing the level of difference to the threshold the level of difference comprises determining a number of edge pixels that have been removed in the second image relative to the first image, and wherein comparing the level of difference to the threshold level of difference comprises comparing the number to a threshold number.
19. The method of any proceeding embodiment, further comprising: determining a second scene transition frame; determining a frequency of scene transitions in a time period based on the first scene transition frame and the second scene transition frame; comparing the frequency to a threshold frequency; and in response to determining that the frequency does not equal or exceed the threshold frequency, selecting a fourth frame in the series of frames to include in the truncated version of the media asset based on the fourth frame appearing in the series of frames, the predetermined number of frames earlier than the second scene transition frame.
20. The method of any proceeding embodiment, further comprising: generating for simultaneous display on a local device, the media asset in a first portion of a user interface and the third frame in a second portion of the user interface, wherein the second portion of the user interface corresponds to the truncated version, and wherein the third frame represents a first scene in the truncated version.
21. A method for providing annotation guidance for media assets, the method comprising: receiving a media asset comprising a series of frames; comparing first content presented to a user at a first frame in the series of frames, and second content presented to the user at a second frame in the series of frames to determine a first level of difference between the first content and the second content; determining that the first frame corresponds to scene transition of a first scene based on the first level of difference; in response to determining that the first frame corresponds to the scene transition of the first scene, selecting a third frame in the series of frames that is in the first scene; determining a first location of the third frame where content present in a respective first location of the first frame is not present; and generating for display, on a local device, the third frame with a foreshadowing overlay at the first location.
22. The method of any proceeding embodiment, further comprising: determining a second location of the third frame where no content is present, and where no content is present in a respective second location of the first frame; and generating for display, on a local device, the third frame with a whitespace overlay at the second location.
23. The method of any proceeding embodiment, selecting the first frame and the second frame based on a frame skip parameter.
24. The method of any proceeding embodiment, further comprising: converting the first frame and the second frame to respective grayscale representations; determining whether the first frame and the second frame require resizing; and in response to determining that the first frame and the second frame requiring resizing, resizing the first frame and the second frame.
25. The method of any proceeding embodiment, wherein generating the difference comprises subtracting edge pixel values of the second image from respective edge pixel values of the first image to generate a set of new pixel values.
26. The method of any proceeding embodiment, further comprising processing the level of difference using a blurring, filtering, or dilation operation.
27. A method for generating derivative products based on truncated media assets, the method comprising: receiving a media asset comprising a series of frames; generating for simultaneous display on a local device, a first frame of the media asset in a first portion of a first user interface and a first option, in a second portion of the first user interface, for creating a derivative product based on the first frame, wherein the first portion of the first user interface provides playback functionality for the media asset; in response to a first user input, selecting the first option, generating for display a third portion of the first user interface, wherein the third portion comprises a second option for adding a detail to the derivative product and a third option for storing the derivative product; in response to a second user input, selecting the second option, adding the detail to the derivative product; in response to a third user input, selecting the third option, storing the derivative product; generating for display, on the local device, a second user interface for displaying derivative products; in response to a fourth user input requesting access to the derivative product, generating for display the detail in the second user interface and a fourth option for accessing the first frame; and in response to a fifth user input selecting the fourth option, generating for display the first frame.

28. The method of any proceeding embodiment, wherein the derivative product is a virtual flashcard.

29. The method of any proceeding embodiment, further comprising: extracting a first frame and a second frame from the media asset, wherein the second frame is subsequent to the first frame in the series of frames; generating, using an edge detection operation, a first image corresponding to the first frame, and a second image corresponding to the second frame; determining a level of difference between the first image and the second image; comparing the level of difference to a threshold level of difference; in response to determining that the level of difference equals or exceeds the threshold level of difference, selecting the first frame as a scene transition frame for a first scene.

30. The method of any proceeding embodiment, further comprising: receiving respective user annotations to a plurality of frames in the first scene; aggregating the respective user annotations on the first frame based on the first frame being selected as the scene transition frame.

31. A tangible, non-transitory, machine-readable medium storing instructions that, when executed by a data processing apparatus, cause the data processing apparatus to perform operations comprising those of any of embodiments 1-30.

32. A system comprising: one or more processors and memory storing instructions that, when executed by the processors, cause the processors to effectuate operations comprising those of any of embodiments 1-30.

33. A system comprising means for performing any of embodiments 1-30.

What is claimed is:

1. A system for providing annotation guidance for media assets, the system comprising:
one or more memory devices storing instructions; and
one or more processors configured to execute the instructions to:
receive a media asset comprising a series of frames;
compare first content, presented to a user at a first frame in the series of frames, and second content, presented to the user at a second frame in the series of frames, to determine a first level of difference between the first content and the second content;
determine that the first frame corresponds to a scene transition of a first scene based on the first level of difference;
in response to determining that the first frame corresponds to the scene transition of the first scene, select a third frame in the series of frames that is in the first scene;
determine a first location of the third frame where content present in a respective first location of the first frame is not present;
determine a second location of the third frame where content present in a respective second location of the first frame is present; and
generate for display, on a local device, the third frame with a foreshadowing overlay at the first location and a whitespace overlay at a second location, wherein the foreshadowing overlay indicates a presence of content in a future frame of the first scene, and wherein the whitespace overlay indicates a lack of content in the future frame of the first scene.

2. A method for providing annotation guidance for media assets, the method comprising:
receiving a media asset comprising a series of frames;
comparing first content, presented to a user at a first frame in the series of frames, and second content, presented to the user at a second frame in the series of frames, to determine a first level of difference between the first content and the second content;
determining that the first frame corresponds to a scene transition of a first scene based on the first level of difference;
in response to determining that the first frame corresponds to the scene transition of the first scene, selecting a third frame in the series of frames that is in the first scene;
determining a first location of the third frame where content present in a respective first location of the first frame is not present; and
generating for display, on a local device, the third frame with a foreshadowing overlay at the first location.

3. The method of claim 2, further comprising:
determining a second location of the third frame where no content is present, and where no content is present in a respective second location of the first frame; and
generating for display, on a local device, the third frame with a whitespace overlay at the second location.

4. The method of claim 2, selecting the first frame and the second frame based on a frame skip parameter.

5. The method of claim 2, further comprising:
converting the first frame and the second frame to respective grayscale representations;
determining whether the first frame and the second frame require resizing; and
in response to determining that the first frame and the second frame requiring resizing, resizing the first frame and the second frame.

6. The method of claim 2, wherein determining the first level of difference comprises subtracting edge pixel values of the second frame from respective edge pixel values of the first frame to generate a set of new pixel values.

7. The method of claim 2, further comprising processing the first level of difference using a blurring, filtering, or dilation operation.

8. The method of claim 2, wherein comparing the first content and the second content to determine the first level of difference between the first content and the second content, further comprises:
inputting the first frame and second frame into a neural network, wherein the neural network was trained by:
inputting a labeled feature input into the neural network, wherein the labeled feature input corresponds to data for a training frame; and
training the neural network to classify the data for the training frame as corresponding to a known classification, wherein the known classification corresponds to a known scene.

9. The method of claim 8, wherein the neural network was further trained by:
receiving data related to user re-classifications of frames classified into scenes by the neural network; and
training the neural network based on the user re-classifications.

10. The method of claim 2, wherein determining that the first frame corresponds to the scene transition of the first scene based on the first level of difference comprises determining a number of edge pixels that have been removed in the second frame relative to the first frame.

11. The method of claim 2, wherein determining that the first frame corresponds to the scene transition of the first scene based on the first level of difference comprises:
   comparing the first level of difference to a threshold level of difference; and
   determining that the first level of difference equals or exceeds the threshold level of difference.

12. A non-transitory, computer readable medium for providing annotation guidance for media assets, comprising instructions that, when executed by one or more processors, cause operations comprising:
   receiving a media asset comprising a series of frames;
   comparing first content, presented to a user at a first frame in the series of frames, and second content, presented to the user at a second frame in the series of frames, to determine a first level of difference between the first content and the second content;
   determining that the first frame corresponds to a scene transition of a first scene based on the first level of difference;
   in response to determining that the first frame corresponds to the scene transition of the first scene, selecting a third frame in the series of frames that is in the first scene;
   determining a first location of the third frame where content present in a respective first location of the first frame is not present; and
   generating for display, on a local device, the third frame with a foreshadowing overlay at the first location.

13. The non-transitory, computer readable medium of claim 12, further comprising:
   determining a second location of the third frame where no content is present, and where no content is present in a respective second location of the first frame; and
   generating for display, on a local device, the third frame with a whitespace overlay at the second location.

14. The non-transitory, computer readable medium of claim 12, selecting the first frame and the second frame based on a frame skip parameter.

15. The non-transitory, computer readable medium of claim 12, further comprising:
   converting the first frame and the second frame to respective grayscale representations;
   determining whether the first frame and the second frame require resizing; and
   in response to determining that the first frame and the second frame requiring resizing, resizing the first frame and the second frame.

16. The non-transitory, computer readable medium of claim 12, wherein determining the first level of difference comprises subtracting edge pixel values of the second frame from respective edge pixel values of the first frame to generate a set of new pixel values.

17. The non-transitory, computer readable medium of claim 12, further comprising processing the first level of difference using a blurring, filtering, or dilation operation.

18. The non-transitory, computer readable medium of claim 12, wherein comparing the first content and the second content to determine the first level of difference between the first content and the second content, further comprises:
   inputting the first frame and second frame into a neural network, wherein the neural network was trained by:
   inputting a labeled feature input into the neural network, wherein the labeled feature input corresponds to data for a training frame; and
   training the neural network to classify the data for the training frame as corresponding to a known classification, wherein the known classification corresponds to a known scene.

19. The non-transitory, computer readable medium of claim 18, wherein the neural network was further trained by:
   receiving data related to user re-classifications of frames classified into scenes by the neural network; and
   training the neural network based on the user re-classifications.

20. The non-transitory, computer readable medium of claim 12, wherein determining that the first frame corresponds to the scene transition of the first scene based on the first level of difference comprises determining a number of edge pixels that have been removed in the second frame relative to the first frame.

* * * * *